US006647855B1

(12) United States Patent
Christiansen et al.

(10) Patent No.: US 6,647,855 B1
(45) Date of Patent: Nov. 18, 2003

(54) APPARATUS AND METHOD FOR DEPLOYING A HYPERVELOCITY SHIELD

(75) Inventors: Eric L. Christiansen, Houston, TX (US); Justin H. Kerr, Houston, TX (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/263,293

(22) Filed: Sep. 30, 2002

(51) Int. Cl.⁷ ................................................. F41H 5/00
(52) U.S. Cl. ....................................................... 89/36.01
(58) Field of Search ............................ 89/36.01, 36.02; 139/425 R; 343/915, 705; 244/173; 136/292

(56) References Cited

U.S. PATENT DOCUMENTS

| 1,376,304 A | * | 4/1921 | Zeglen ........................ 428/608 |
| 2,562,951 A | * | 8/1951 | Rose et al. .................. 442/208 |
| 3,059,322 A | * | 10/1962 | Teague ........................ 29/600 |
| 3,165,751 A | * | 1/1965 | Clark .......................... 343/915 |
| 3,722,355 A | * | 3/1973 | King .......................... 89/36.02 |
| 3,735,943 A | * | 5/1973 | Fayet ......................... 244/173 |
| 3,826,172 A | * | 7/1974 | Dawson ..................... 89/36.02 |
| 3,969,563 A | * | 7/1976 | Hollis, Sr. .................. 428/175 |
| 4,030,102 A | * | 6/1977 | Kaplan et al. ............... 343/915 |
| 4,666,107 A | * | 5/1987 | Berry ......................... 244/173 |
| 4,699,849 A | | 10/1987 | Das |
| 4,836,084 A | | 6/1989 | Vogelesang et al. |
| 5,067,388 A | | 11/1991 | Crews et al. |
| 5,080,963 A | | 1/1992 | Tatarchuk et al. |
| 5,091,242 A | | 2/1992 | Chung |
| 5,132,168 A | | 7/1992 | Meyn et al. |
| 5,178,922 A | | 1/1993 | Ferrier et al. |
| 5,200,256 A | | 4/1993 | Dunbar |
| 5,217,185 A | | 6/1993 | Rucker |
| 5,228,644 A | * | 7/1993 | Garriott et al. ............. 244/173 |
| 5,235,788 A | * | 8/1993 | Maimets ...................... 52/108 |
| 5,257,034 A | * | 10/1993 | Turner et al. ............... 343/915 |
| 5,454,403 A | * | 10/1995 | Kerr et al. .................... 139/35 |
| 5,520,747 A | * | 5/1996 | Marks ........................ 136/245 |
| 5,610,363 A | * | 3/1997 | Crews et al. .............. 89/36.02 |
| 5,756,922 A | * | 5/1998 | Fuller ........................ 89/36.02 |
| 5,785,280 A | * | 7/1998 | Baghdasarian ............. 244/173 |
| 5,927,654 A | * | 7/1999 | Foley et al. ................ 244/173 |
| 6,050,526 A | * | 4/2000 | Stribling, Jr. ............... 244/173 |
| 6,137,454 A | * | 10/2000 | Peck .......................... 343/912 |
| 6,215,458 B1 | * | 4/2001 | Aguttes et al. ............. 343/915 |
| 6,505,795 B1 | * | 1/2003 | Thompson et al. ......... 244/173 |

FOREIGN PATENT DOCUMENTS

WO   WO9200496   * 9/1992

* cited by examiner

Primary Examiner—Charles T. Jordan
Assistant Examiner—Jordan M Lofdahl
(74) Attorney, Agent, or Firm—James M. Cate

(57) ABSTRACT

Provided herein are apparatuses for deployment of at least one hypervelocity shield on a structure in exoatmospheric space. The apparatuses comprise a means of attaching to the structure at least at one place on the structure and further comprise at least one of the hypervelocity shields and a means of deploying said shields. Also provided are methods of deploying the hypervelocity shields using said apparatuses.

40 Claims, 16 Drawing Sheets

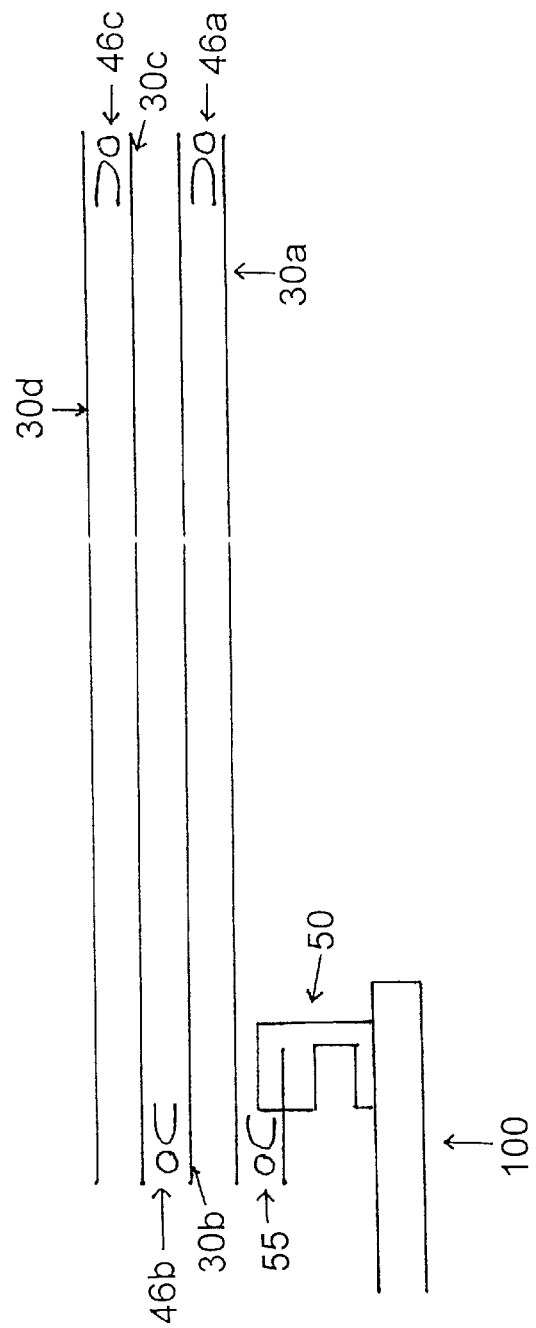

APPARATUS AND METHOD FOR DEPLOYING A HYPERVELOCITY SHIELD

ORIGIN OF THE INVENTION

The invention described herein was made by employees of the United States Government and may be manufactured or used by or for the Government of the United States of America for governmental purposes without the payment of any royalties thereon or therefor.

BACKGROUND OF THE INVENTION

1. Field of the Invention

This invention relates generally to the fields of hypervelocity impact shielding and to the deployment of such shields. Specifically, the present invention relates to apparatuses and methods to deploy protective hypervelocity shields adjacent exposed portions of a space vehicle for preventing damage to the vehicle caused by impact with meteoroids and orbiting particles.

2. Description of the Related Art

Because of the possibility of damage to space vehicles and orbiting satellites caused by meteoroids and orbital debris that may impinge upon the vehicles at very high relative velocities, shielding structures for protecting such space vehicles are an important design consideration. In the case of orbital vehicles, such as satellites, there is a danger of collision with debris that remains in earth orbit after being released from various spacecraft. Such debris may have originated from the fragmentation or break up of portions of orbiting spacecraft, e.g., from particles released in connection with the inadvertent detonation of spacecraft propulsion system components or the like.

Debris may remain in orbit for extended periods and the probability of damage to spacecraft and orbiting satellites is thus greater than was the case in the early phases of space exploration prior to the accumulation of such space debris over the years. Orbiting spacecraft or satellites may approach and impact such orbital debris traveling at relative velocities of 10 kilometers per second or greater and the debris particles therefore impact such orbiting spacecraft with substantial energy. The kinetic energy of such a particle as it impacts upon an orbiting vehicle is, of course, proportional to its mass and to the square of its velocity relative to the vehicle.

Additionally, the threat from incoming meteoroids is also of concern. Meteoroids may approach the space vehicle at even greater relative velocities than man-made, orbital debris particles, but they are less frequently encountered than are the increasingly common man-made debris for spacecraft in low Earth orbit; i.e., at altitudes less than 1500 kilometers above the Earth's surface. In the description to follow, the term "particle" should be understood to refer both to man-made particles and meteoroids, and the term "hypervelocity" refers to relative velocities of two kilometers per second or greater. The term "particle" is used to refer to objects of diameters up to 10 centimeters in diameter. Typically, the orbits for debris objects greater than 10 centimeter in diameter are tracked by ground radar systems, permitting active spacecraft the necessary information to perform maneuvers away from potential collisions with tracked objects.

Additionally, man-made space debris can remain in orbit for extended periods and such debris is largely concentrated in altitude regions commonly used by orbiting vehicles and satellites. The impact of space debris against orbiting satellites, or, alternately, the impact of the orbiting satellite against a debris particle, also may tend to break up the debris particle thereby generating a quantity of smaller secondary debris fragments all of which also remain in orbit. This constitutes additional potential hazards to orbiting spacecraft and satellites.

Orbital debris particles and meteoroids are of widely differing sizes, and their diameters may typically range from 0.01 cm to 1.0 cm or greater. Those of less than several centimeters in diameter are generally too small for electro-optical tracking and avoidance maneuverance. However, if they are of sufficient size and density, such orbital debris particles and meteoroids may have sufficient energy to compromise critical components or systems of a spacecraft, or penetrate the space suits of astronauts engaged in extra-vehicular activities.

As will be appreciated by those in the art, any apparatus or system for protecting an orbital vehicle from space debris and meteoroids must be evaluated both in terms of its effectiveness in breaking up particles of given ranges of densities and velocities and of its size and weight. Obviously, the additional weight entailed in such shielding structures reduces the effective payload of the spacecraft. Because of the very high costs per kilogram of launching a structure into earth orbit or beyond, weight limitations are a major consideration in spacecraft design. Thus, protection against orbital debris could be provided by the use of a single wall, i.e., monolithic" shield, of heavy sheet material of sufficient density and thickness. For example, protection against substantially all orbiting debris of diameter less than 0.3 centimeters could be achieved through the use of a single steel wall that is 1.3 cm thick.

However, the weight of such a vehicle would render it impractical for space application and would reduce the available payload substantially. Thus, the walls and bulkheads of most space vehicles are typically of aluminum or various lightweight alloys and are normally about 0.25 inches (0.6cm) or less in thickness. Such wall structures are structurally adequate for most applications where they typically provide the ability to contain gases and liquids under pressure. For instance, the inner wall or pressure shell of the inhabited modules on space stations such as Mir or those on the International Space Station vary from 0.2 cm to 0.6 cm thick. Similar construction exists for propellant tanks and pressurized gas carriers.

Although these pressure vessels are more than adequate from a structural standpoint, they are susceptible to penetration by meteoroids and debris particles of diameters greater than 0.1 centimeters, particularly in the case of particles or projectiles of materials denser than that of the wall structure itself. Accordingly, the field has sought to provide shield structures adapted for protection from larger meteoroid and orbital debris particles, i.e., particles up to 2 centimeters diameter, to be deployed adjacent and in covering relationship with space craft and satellite wall structures exposed to such debris for minimizing the danger of penetration by impinging particles.

A crucial consideration with respect to the design of such shielding structures is the density of the impacting particles. Although aluminum shielding and aluminum wall structures are generally effective against relatively light-weight particles, such as space debris of aluminum, or relatively light, non-metallic meteoroids, they provide substantially less protection against denser debris particles such as fragments of steel, copper, nickel alloys, and the like. Such hazards- from high-density debris have not generally been taken into account in the design of spacecraft and satellites currently in use. In the future, however, the potential for damage to space craft caused by impact with high-density hypervelocity particles is expected to be of increasing concern, particularly for missions of extended duration and at particular altitudes.

In the past, shielding structures of enhanced effectiveness were provided by the use of one or more "bumper" sheets. Such multi-layer shield designs serve to increase the effectiveness of the shielding over that of a single, monolithic wall of equivalent weight. An outer bumper sheet is typically deployed in spaced relation to a heavier, back sheet that may constitute the inner wall or critical component of the spacecraft that requires protection from impact damage. The bumper sheet is spaced from the back plate by a standoff distance on the order of several centimeters. The function of the bumper sheet is to break up any impinging particle into a cloud of fragmented and partially molten and/or vaporized material of lower energy level per unit of surface area and reduced penetrating power than that of the incoming particle itself.

Such shield or multi-layer shield structures include those known as "Whipple shields," after the originator. Aluminum alloys have been typically used for both the bumper sheets and the back plates of such structures. Additionally, multiple layers of insulative material, in the form of 10 to 30 separate aluminized mylar or kapton foil sheets, may be included in the structure, typically sandwiched between the bumper shield and the back plate, for thermal control and insulation. Optimal shielding dimensions for such structures are dependent upon the geometry and mass of the object to be protected, but generally, the ratio of the standoff spacing of the outer bumper and the diameter of incoming particles will be in the order of 30:1 or greater.

U.S. Pat. No. 5,601,258 discloses a spacecraft shield having one or more bumper elements, a cloud stopper element located within the bumper element and a fragment stopper element which is located within the cloud stopper element. This shield of U.S. Pat. No. 5,601,258 completely encloses the spacecraft and is permanently mounted either on main structures of the spacecraft or at hardpoint end structures of the spacecraft. The impacting particles are successively fragmented, possibly vaporized, and dispersed over a wider area or stopped at a layer as each layer is encountered in the shield.

A more recent shielding structure is provided in U.S. Pat. No. 6,298,765. The hypervelocity impact shield assembly includes at least one sacrificial impactor disrupting/shocking layer and at least one space-rated open cell foam material positioned between the sacrificial layers with spacing elements therebetween to form a multishock assembly. The assembly is enclosed by a cover and mounted to the spacecraft by such things as snap attachment elements, strap attachment elements or Velcro® hook and pile fastening attachment elements. The assembly may be flattened after attachment and deployed after launch of the spacecraft to accommodate more payload.

Accordingly, the inventors have recognized a need in the art for an effective apparatus and method of deploying shielding structures on spacecraft. More specifically, the prior art is deficient in an apparatus and method of deploying a hypervelocity shield on-orbit, yet which do not entail substantial weight penalties which would substantially reduce available payload. The present invention fulfills this longstanding need and desire in the art.

SUMMARY OF THE INVENTION

In one embodiment of the present invention, there is provided an apparatus for deploying a hypervelocity shield on a structure in exoatmospheric space. The hypervelocity shield may comprise a mesh formed of wires of a ductile material where at least one of the wires optionally is a shape-memory alloy and a supporting matrix formed of strands of a material that has a density less than that of the ductile material. The strands of the supporting matrix may be interwoven with the mesh and thus comprise a means for supporting the mesh in a predetermined configuration.

The apparatus also comprises a frame structure attached to at least one edge of the hypervelocity shield and further has an insulated electric cable to deploy the hypervelocity shield. The frame structure provides support for the hypervelocity shield. Optionally, the frame structure may be insulated and formed of the shape-memory alloy. The instant apparatus also has a means of operably attaching the hypervelocity shield to the structure.

In another embodiment of the present invention, there is provided an apparatus to deploy at least one hypervelocity shield on a structure in exoatmospheric space. The hypervelocity shields described herein are wound on rolls. The apparatus further comprises a shield storage cassette which can store at least one of the rolled shields and has a cover on its front face. The shields are attached to a back face of the cassette cover. The apparatus further has a mast storage canister rotatably mounted on the top side of the cassette which contains an extendible/retractable mast; the canister has a cover on the front open face and the mast is attached to the back side of the cover. Additionally, the mast cover is connected to the shield storage cassette cover by a hinging mechanism. Both the mast storage canister and a forward arm of the hinging mechanism rotate in a plane parallel to the plane of the subsequently deployed hypervelocity shields. Furthermore, the apparatus can be attached to the structure via two mounting attach points on both the mast storage canister and the shield storage cassette cover.

In yet another embodiment of the present invention there are provided methods of deploying hypervelocity shields described herein using the apparatuses described herein.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIG. 4A–4D depicts the deployment sequence for a hypervelocity shield comprised of the panels depicted in FIG. 2 and FIG. 3.

DETAILED DESCRIPTION OF THE INVENTION

Figure 1A:
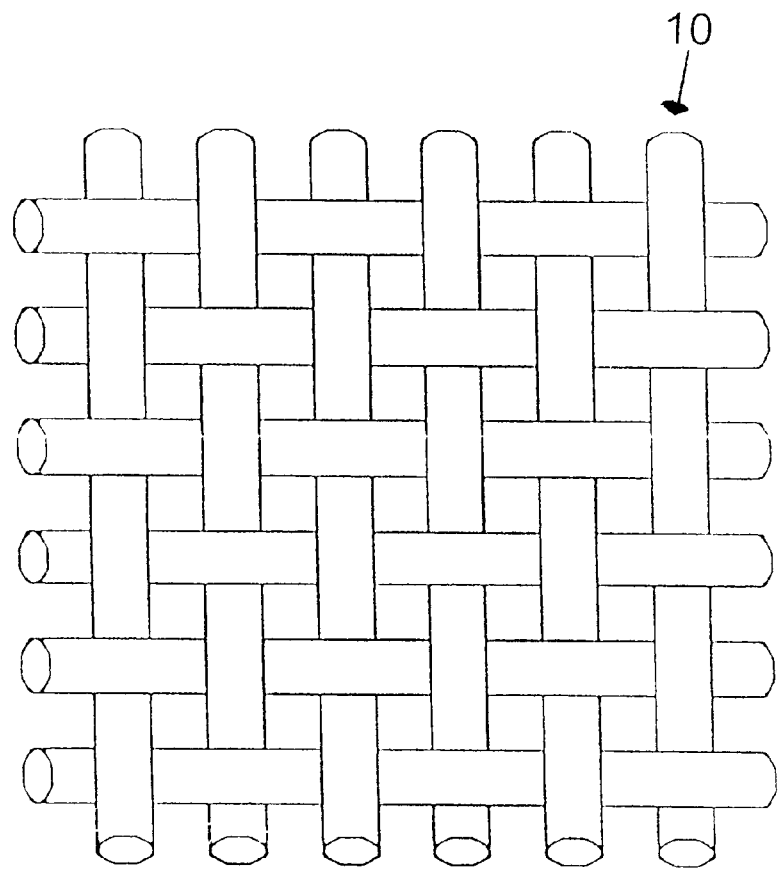
FIG. 1A is a schematic representation of the square pattern wire mesh.

In one embodiment of the present invention there is provided an apparatus for deploying a hypervelocity shield on a structure in exoatmospheric space comprising a hypervelocity shield having a mesh formed of wires of a ductile material where at least one of the wires optionally comprises a shape-memory alloy and a supporting matrix formed of strands of a material having a density less than that of said ductile material such that the strands are interwoven with the mesh and comprise a means for supporting the mesh in a predetermined configuration; a frame structure attached to at least one edge of the hypervelocity shield, where the frame structure further comprises an insulated electric cable to deploy the hypervelocity shield and where the frame structure optionally is insulated and formed of the shape-memory alloy and thereby supports the hypervelocity shield; and a means of operably attaching the hypervelocity shield to the structure.

In this embodiment, the ductile material may be essentially cadmium, zinc, tin, lead, tantalum, copper, or steel or an alloy thereof. The ductile material may further have a density at least as great as the density of the particles from which the structure is to be shielded. These densities may range from about 2.3 grams per cubic centimeter to about 14 grams per cubic centimeter. The ductile material may have a melting point of about 430° C. Also, in this embodiment the supporting matrix may be formed of strands of ceramic cloth. Additionally, in this embodiment the hypervelocity shield may comprise wires of a martensitic shape memory alloy. These alloys may comprise at least two of nickel, titanium, aluminum, silicon, manganese, iron, copper, zinc, silver, cadmium, indium, tin, platinum, gold, or thallium. A representative example of an alloy is nickel-titanium.

Also in this embodiment, the hypervelocity shield may be attached to the frame structure via clips and brackets, velcro or sewing to the frame or a combination thereof. Further, the electric cables may be routed adjacent to the frame structure either externally or internally to the structure. Optionally, the frame structure is insulated and comprised of the shape-memory alloy. The hypervelocity shield of the instant invention may be operably attached to the structure via a mechanism that comprises an attachment fitting to attach the shield to the structure. The mechanism further has a connection for a power and data channel which is attached to the fitting by a boom. The boom may be about 4 inches to about 12 inches long. Additionally, the mechanism has an electronic assembly and controller component electrically connected to the power and data channel. The controller electrically controls power to the electric cable(s) to deploy the hypervelocity shield.

In an aspect of this embodiment the hypervelocity shield is formed of a plurality of panels having a rectangular shape and further comprising a hinging means to connect the panels whereby the panels are hinged so as to extend linearly one from the other when the panels are fully deployed. Concomittantly, the frame structure is disposed around at least two outer edges of each of said panels. The frame structure further includes straps formed of a shape-memory alloy which are operably attached externally to the frame structure. In this aspect, a one of the first straps connects the first of the panels to the attaching means. The attaching means further has an additional insulated electric cable connected to the controller to activate the first strap and thereby deploy the first panel. A second set of straps connects the panels one to the other. These straps deploy the panels upon activation of the shape-memory alloy by the insulated electric cable adjacent the frame structure.

Optionally, the frame structure can be formed of a shape-memory alloy as disclosed supra. In this particular aspect, the attaching means further comprises a third insulated electric cable controlled by the controller and activating the shape-memory frame to conform to a predetermined configuration.

In another aspect of this embodiment, the hypervelocity shield is formed of a continuous sheet of the mesh and the support matrix. The sheet may have a length greater than its width. Furthermore, the continuous sheet may have a plurality of wires formed of the shape-memory alloy disclosed supra which are disposed along the length of said sheet. In this aspect the frame structure is disposed across the width of a first end of the sheet such that the sheet is rolled up and adjacent to the frame structure. The insulated electric cable controlled adjacent the frame structure as disclosed is activated by the controller causing the length-wise shape-memory wires to conform to a predetermined configuration which thus unrolls and deploys the continuous sheet. Optionally, the continuous sheet may have a plurality of wires formed of the shape-memory alloy disposed along the width of the sheet. In this optional aspect a second insulated electric cable controlled by the controller activates the width-wise shape-memory wires to conform the deployed continuous sheet to a second predetermined configuration.

In another embodiment of the present invention, there is provided a method of deploying a hypervelocity shield comprising the steps of attaching the shield to the structure via an attachment means, controlling power to a first insulated electric cable and deploying the hypervelocity shield. The materials comprising the shield and their physical attributes are described supra.

In an aspect of this invention the hypervelocity shield is comprised of a plurality of panels as described supra. The panels are attached to the structure in a stowed position. An example of a stowed position is where all panels have an angle of 0° relative to the structure. In this aspect power is routed to the first shape-memory strap via the second insulated electric cable to partially deploy the first panel 90° relative to the structure; the remaining panels are still in the stowed position relative to the first panel. Subsequently, power is routed to the first insulated electric cable to fully deploy all of the plurality of panels by activating the second set of shape memory straps. Optionally, in a related aspect, if the frame structure is insulated and formed of a shape-memory alloy, power is routed to a third cable to activate the shape-memory frame to conform to a predetermined configuration.

In another aspect of this embodiment, the apparatus is attached such that the first panel is initially at a 90° angle relative to the structure and the remaining panels are in the stowed position relative to the first panel. Power is sequentially routed to the second cable and the first cable to activate the shape-memory straps to deploy the panels; or, alternatively, power is simultaneously routed to the first cable and the second cable such that the first shape memory strap which is activated by the second cable deploys the first panel at a rate that is half the rate of deployment of the remaining panels.

In yet another aspect of this embodiment the hypervelocity shield comprises a continuous sheet as described supra. Power is routed to a first electric cable to activate the length-wise shape-memory wires to conform to a predetermined configuration thereby deploying the continuous sheet comprising the hypervelocity shield. In a related aspect, if the continuous sheet further comprised a plurality of shape-memory wires disposed along the width of the sheet, then power is routed to a second electric cable to activate the width-wise shape-memory wires to conform to a predetermined configuration after deployment of the continuous sheet.

In yet another embodiment of the present invention there is provided an apparatus to deploy at least one hypervelocity shield on a structure in exoatmospheric space. The shields are formed of the wired mesh and support matrix as described supra and are individually wound on rolls. The apparatus may comprise multiple sheets. An example is three or five sheets.

Additionally, the apparatus comprises a shield storage cassette, where the storage cassette contains at least one of the rolls of shielding and where the rolls of shielding are individually stored one on the other in the storage cassette. The storage cassette may comprise a shield storage cassette cover which is in covering relationship to an open end of the cassette when the roll(s) of shielding are stored therein, where the cassette cover has a front side facing outwardly and a back side opposite said front side. The back side comprises a means of individually attaching in parallel relationship a front edge of each of said rolls of shielding. The cassette cover opens along a plane perpendicular to the face of the cover.

In this embodiment the apparatus further comprises a mast storage canister which has an open front end and a closed back end opposite the front end and is rotatably mounted to the top of the shield storage cassette. The mast storage canister lies adjacent to and parallel to the top side of the storage cassette. The plane of rotation is parallel to that of a subsequently deployed shield. The canister also comprises an extendible/retractable mast disposed within and a circular mast cover disposed in covering relationship to the open front end of the canister when the mast is retracted therein. The mast cover has a front side facing outwardly and has two mounting attach points thereon which comprise means to attach the deployed shields to the structure and a back side opposite the front side. The back side comprises a means of attaching a front edge of said retractable mast to the mast cover. The mast storage container also has two mounting attach points fastened external to and at its back end. The mounting attach points comprise means to attach the apparatus to the structure.

Also in this embodiment the apparatus comprises an extending means to simultaneously extend the mast and open the shield storage cassette cover. The extending means comprises a hinging mechanism. A forward arm of the hinge is attached to the front face of the mast cover and a rearward arm of the hinge is attached to the front face of the cassette cover. The forward arm of the hinge rotates in a plane parallel to the subsequently deployed shields.

In yet another embodiment of the present invention there is provided a method of deploying at least one hypervelocity shield on a structure comprising the steps of attaching the apparatus to deploy at least one shield as described immediately supra to the structure at the mounting attach points on the mast storage container; rotating the mast storage container 90°; rotating the forward arm of the hinging means 90°; opening the mast storage cover to fully extend the mast; and attaching the mast storage cover to the structure at the mounting attach points on the front face of the mast storage cover thereby deploying the hypervelocity shield(s).

In still another embodiment there is provided a method of deploying a hypervelocity shield on a structure comprising the steps of attaching a canister containing a continuous hypervelocity shield as described supra rolled within the canister to an outer surface of the structure, deploying the hypervelocity shield via a motor means and thermally activating the longitudinally disposed shape memory wires contained within the hypervelocity shield by an electrical means to conform in a protective relation to the outer surface of the structure. The hypervelocity shield is formed of the mesh, support matrix and shape memory alloys as described supra.

The present invention provides apparatus and methods for the deployment of flexible bumper shields. Upon deployment by the apparatuses and methods described herein, the hypervelocity shield provides substantial impact resistance against hypervelocity particles of high density and velocity, yet is of rugged, compact, and relatively lightweight construction. It may be conveniently tailored to a wide range of applications for effective deployment. Additionally, it may also comprise a shape-memory alloy programmed with a preconfigured shape to minimize payload concerns during launching of the space vehicle. The hypervelocity shield may be deployed as hinged panels or as continuous sheets of wire mesh.

The apparatus may comprise straps of a shape memory alloy which are activated by at least one circuit to deploy the shield. Alternatively, the shield itself may comprise a shape memory alloy which is activated to deploy the shield and/or to conform the shield to a preprogrammed shape upon deployment. Conformation of the shield may be performed in conjunction with deployment of the shield using the activated shape memory straps.

In the embodiments illustrated herein, the wire mesh bumper structure is deployed and supported adjacent to and in mutually spaced relationship with another shielding structure such as a Whipple shield or a multi-shock shield which itself is adjacent to and in mutually spaced relationship to an outer pressure wall of a space vehicle or other structure which is to be protected from orbital debris particles or meteoroids. In its application to an orbiting satellite or space station component, the shielding structure is positioned in protective, covering relationship with the forward or leading portions of the vehicle, the wall structure thus being representative of a portion of the vehicle which confronts and is subject to impact with particles which may lie in the path of the vehicle.

In the instant invention, the hypervelocity shield may be attached to the structure at different times. For example, the shield may be attached on the ground prior to launch of the structure to exoatmospheric space. The shield may be attached on-orbit by an on-orbit crew during an EVA or on-orbit by a remote manipulator system operated by a remote operator. The shield may also be stowed in differing ways depending on the means of deployment used. It is contemplated that the shield can comprise panels which are stowed in an accordion-like configuration, one folded back against and parallel to the others. Alternatively, the shield can comprise a single roll of shielding material that is rolled up when stowed. These rolls of shielding material may be stored in canisters attached to the structure until they are deployed.

The following figures depict various embodiments for deploying a shielding structure that may be used to protect a module on a space station, for example. However, such depiction in no way limits the various structures, compositions, numbers of panels, or deployment means that a deployable shielding structure of the present invention may encompass nor the type of space vehicle that such a structure may protect. The embodiments and variations described in detail herein are to be interpreted by the appended claims and equivalents thereof.

With initial reference to FIG. 1A, the bumper shield to be deployed comprises a wire mesh screen 10 of a first material, which is preferably a dense, ductile material such as aluminum, cadmium, lead, tin, tantalum, titanium, steel or copper or alloys of these or other metals. As seen more clearly in FIG. 1B, a supporting matrix 15, formed of strands of a second material supports the wire mesh if desired for increased structural strength. The second material is a flexible, fibrous material of ceramic fiber such as an alumina-silica composite. Nextel® fiber, manufactured by the 3M company is a suitable ceramic fiber.

With the possible exception of aluminum, steel or copper wire, which may be woven into a mesh fabric without the ceramic fiber support, such ductile, high density metals are typically of relatively low melting points and relatively low structural integrity and strength. These metals have densities from about 6 g/cm$^3$ to about 14 g/cm$^3$ and have melting points less than about 430° C. Components constructed of such materials would not normally be considered suited for the rigors of space flight. Therefore, in accordance with the present invention, the matrix 15, supported by a frame (not shown), serves to support and strengthen the mesh 10 as a part of the bumper shield (not shown). Preferably, the matrix fibers 15 are interwoven with the mesh 10, as seen in FIG. 1B, and the resulting composite bumper sheet (not shown) is of high strength and vibration resistance due to the high tensile strength of the fibers 10.

Figure 1B:
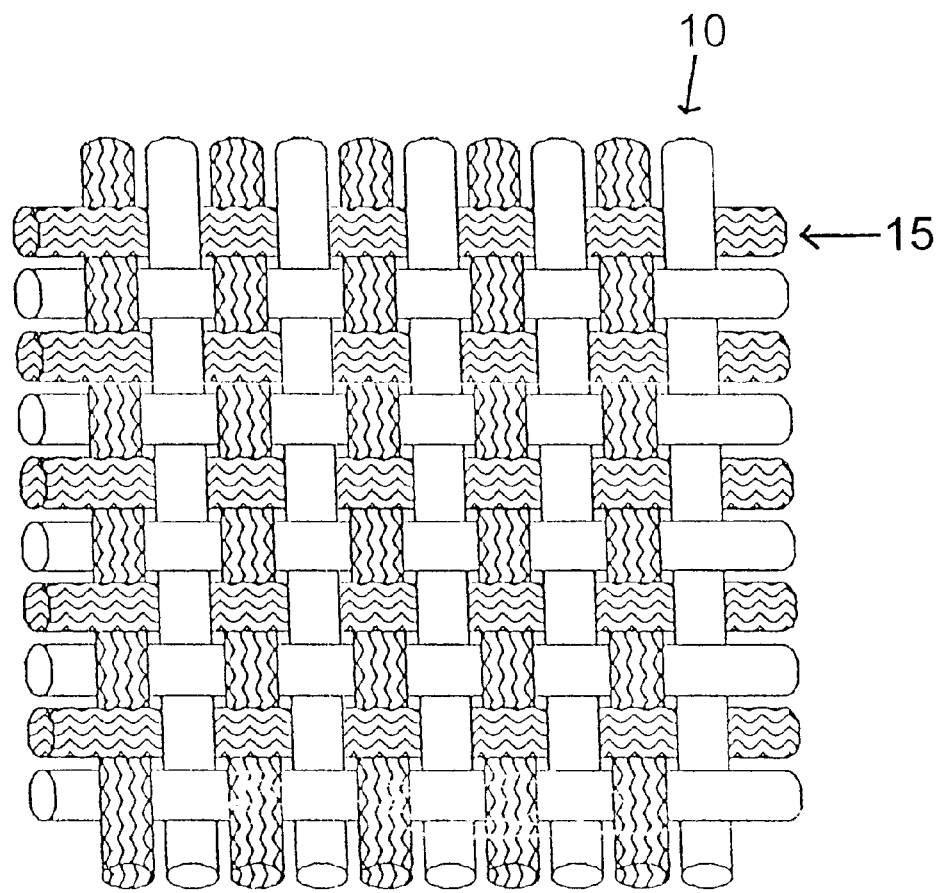
FIG. 1B is a schematic representation of the square pattern wire mesh woven into a ceramic fabric.
Figure 1C:
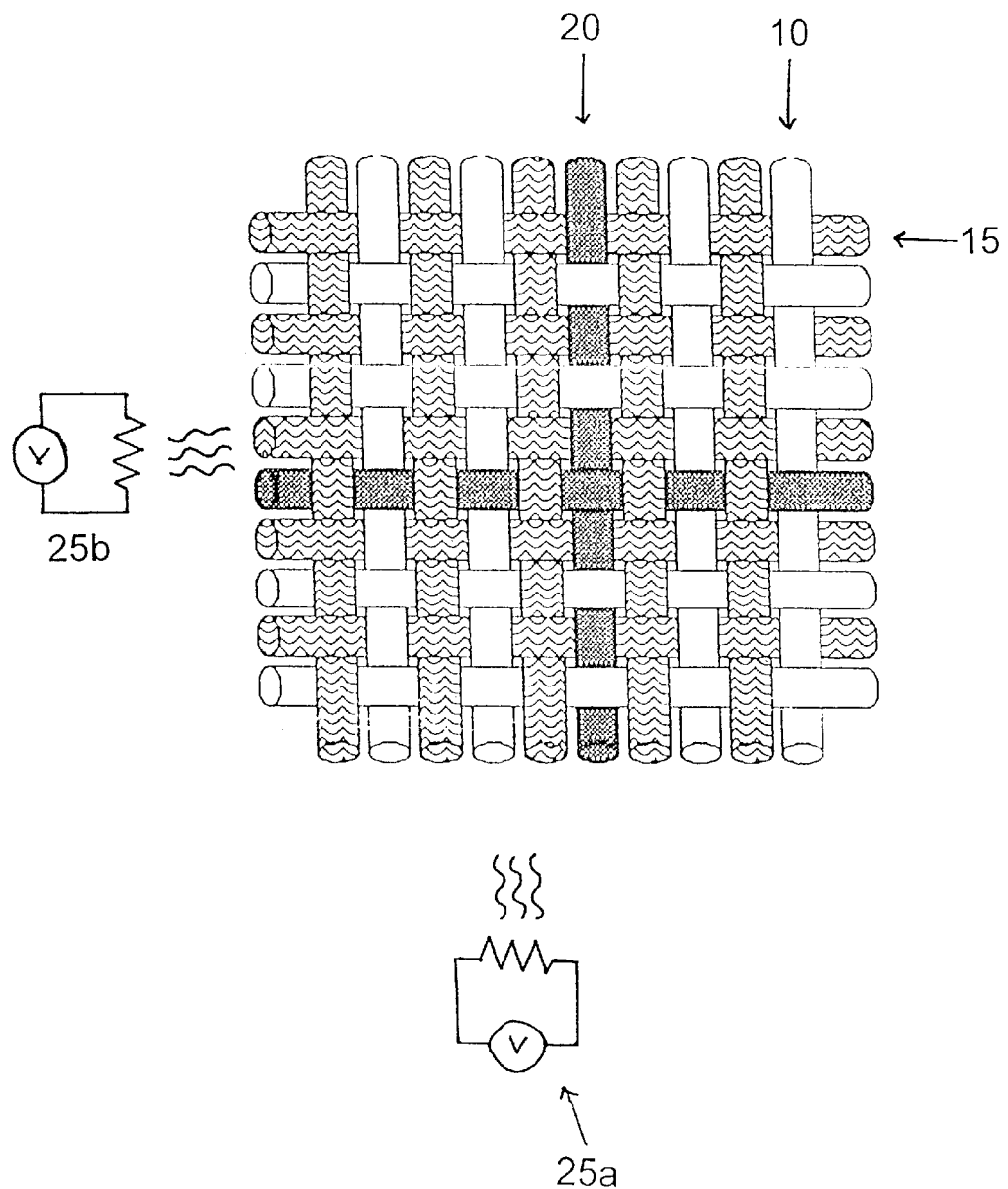
FIG. 1C is a schematic representation of FIG. 1B including shape-memory metal wires in the outer bumper screen.

With continued reference to FIGS. 1A and 1B, yet another embodiment of the woven matrix is depicted in FIG. 1C. In this embodiment, some or all of the metal wires 10 are replaced with shape-memory alloy wires 20 and woven with the matrix fibers 15. Such wires can comprise a martensitic, shape memory alloy of two or more of nickel, titanium, aluminum, silicon, manganese, iron, copper, zinc, silver, cadmium, indium, tin, platinum, gold, or thallium. An example of a martensitic, shape-memory alloy used is nickel-titanium. An electric current 25a,b supplied to the shape-memory alloy wires 20 heats the wire mesh bumper (not shown), which is initially deformed to another shape, e.g., during launching of the space vehicle or prior to attachment to the exterior of the space vehicle during an EVA, to a temperature of about 100° C. to greater than about 120° C. whereupon a preprogrammed shape in the shape memory wire 20 is actuated during orbit and after the shield structure (not shown) is deployed.

The shape memory wires 20 can be arranged in a parallel, unidirectional pattern, or as shown in FIG. 1C, the wires 20 can be woven into an overlapping square mesh pattern in either one or both directions. This configuration is similar to a solid bumper sheet, although the woven mesh pattern results in a lighter weight configuration, and is as capable at disrupting the particle as a heavier solid bumper. Where the wires 10,20 overlap, the bumper thickness to particle diameter ratio is double the wire to particle diameter ratio. This effectively creates localized mesh areas with greater forces exerted on the particle by increasing shock durations in the particle during the impact. In addition, the wires have the advantage that the shock does not propagate as far from the impact site because the additional free surfaces results in less material being removed from the bumper (not shown). Furthermore, the wire geometry dictates that less material and smaller particles, including smaller secondaries, are produced in the debris cloud traveling toward the rest of the rest of the shield than would be generated with a solid bumper.

With continued reference to FIGS. 1A–1C, FIG. 2 depicts a flat or non-conformal panel 30a of rectangular shape having a first side 31 and a second side 32 both about 15 feet wide and having a third side 33 and a fourth side 34 both about 10 feet long. The panel 30a comprises a frame 40 and high-density wire and hybrid cloth bumper 38. The bumper shield 38a is mounted by clips, brackets, velcro, sewing the bumper to frame 40 or a combination thereof. The bumper shield 38a is attached to the frame 40 by suitable means such as but not limited to grommets, bolts, screws, ties or other mechanical means or adhesive or Velcro. Frame 40 is a hollow light weight structure comprising a metal such as aluminum or titanium or comprising a composite material such as graphite-epoxy. Frame 40 further comprises electric cabling 42 routed along the first side 31, the third side 33 and the fourth side 34 of panel 30a either externally to the frame structure 40 or internally through the hollow core of the frame structure 40.

Figure 2A:
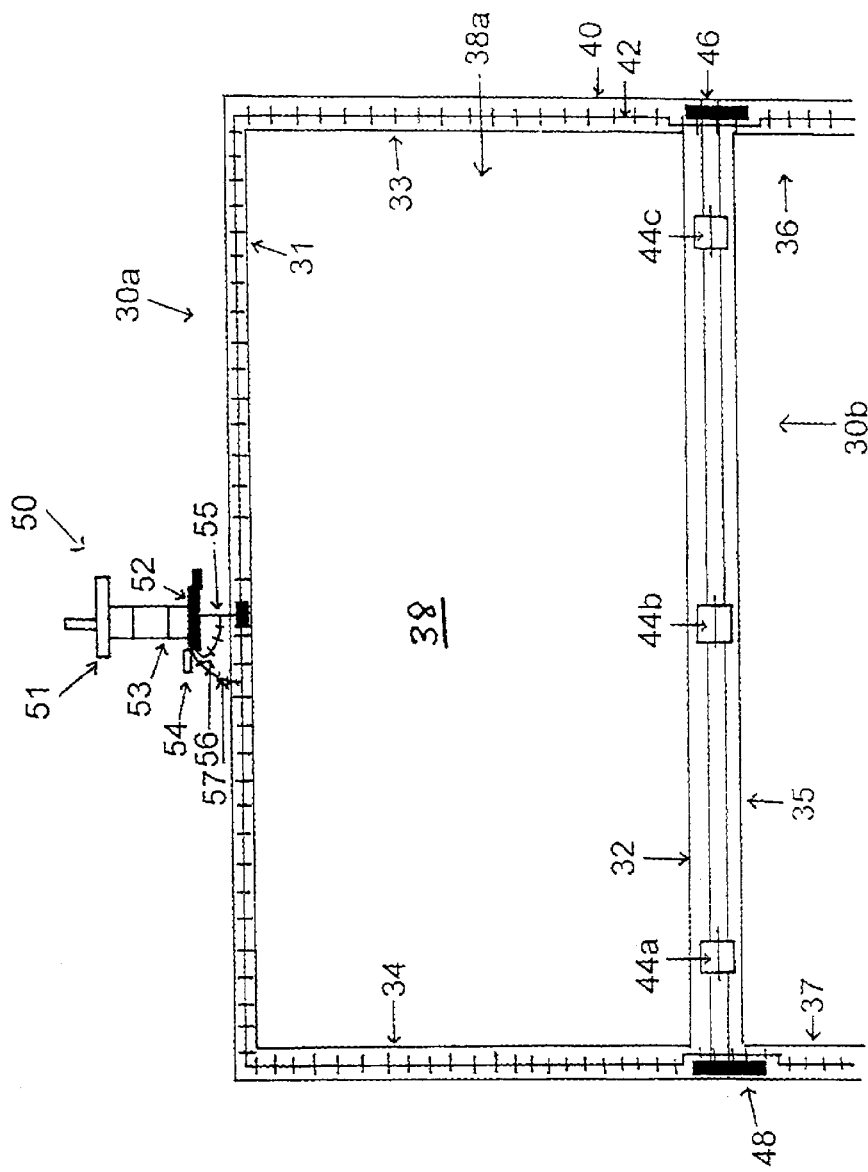
FIG. 2A depicts a front view of a deployable flat or non-conformal panel.
Figure 2B:
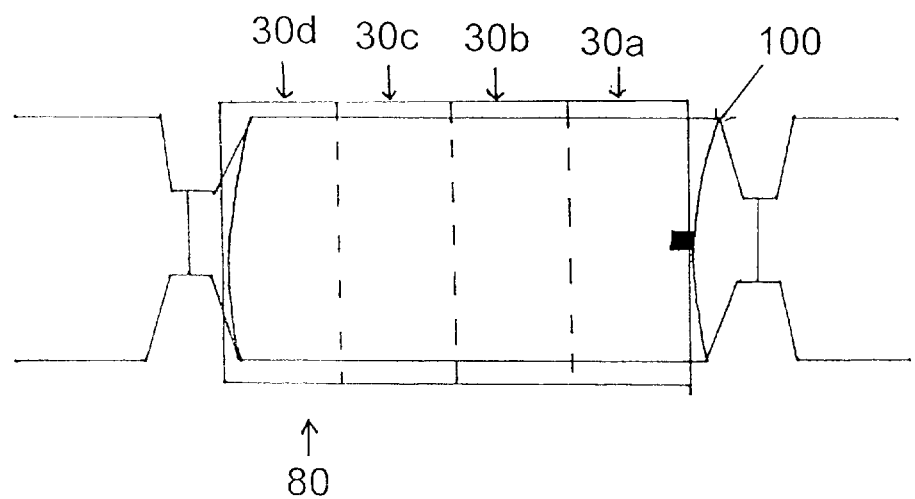
FIG. 2B depicts a series of four deployable flat panels attached to and protecting a cylindrical spacecraft shell. The panels are non-conforming with the protected spacecraft surface.

Panel 30a is the first of four panels 30a,b,c,d (30c,d not shown) all of which comprise the frame 40 and the high density wire 10 and matrix 15, that comprise the deployable shield structure 80 as depicted in FIG. 2B. Panel 30a is attached to panel 30b by three hinges 44a,b,c which fasten to a second side 32 of panel 30a and to a first side 35 of panel 30b. In a like manner the second side (not shown) of panel 30b is hinged to the first side of panel 30c (not shown) and the second side of panel 30c (not shown) is hinged to the first side of panel 30d (not shown). Optionally, if deemed necessary, the fourth side of panel 30d (not shown) may be attached as described supra to the structure to be shielded. The electric cabling 42 continues along the third and fourth sides of the frame on panels 30b,c,d (30c,d not shown) either external to the frame 40 or internally through the hollow core of the frame structure 40 as with panel 30a.

The frame 40 with the high density wire 10 and matrix 15 attached therein is itself attached to the space vehicle at a point about midway along a first side 31 of frame 40 via an attachment fitting 50. Attachment may be effected by such means as mechanical bolting, a probe or clip mechanism, magnetic male/female attachment, adhesive, velcro or any other suitable means. The attachment fitting 50 is operably connected to the space vehicle (not shown) at a first end 51 and to an electronic assembly and controller 52 at a second end by a boom 53 at least 4 inches to about 12 inches long. A power/data channel connection 54 plugs into the space vehicle power and data management system (not shown) A shape-memory alloy cable 55 comprised of a shape-memory alloy is connected to the controller 52 at a first end and to the first side 31 of panel 30*a* at a second end. When the hinged panels are in the stowed position such that surface of panels 30*a,b,c,d* are flat against and parallel to each other and prior to activation of the shape-memory alloy, the memory-alloy cable 55 has a 180 degree angle between the attachment/controller means 50,52 and the frame 40. After activation of the shape-memory alloy, the shape-memory alloy cable 55 is at an angle of ninety degrees after the initial deployment step and prior to deploying the remaining panels 30*b,c,d* (not shown).

Additionally, two shape memory alloy straps 46,48 connect each of panels 30*a* to 30*b*, panels 30*b* to 30*c* (not shown) and panels 30*c* to 30*d* (not shown). The shape memory alloy straps 46,48 are attached at the two outer corners formed by the frame 40 attached at the second 32 and third 33 sides and the second 32 and fourth 34 sides on panel 30*a* and at the corresponding proximate corners formed by the first 35, third 36 and fourth 37 sides of the frame 40 on panel 30*b*. Panel 30*b* is hinged to panel 30*c* (not shown) and panel 30*c* is hinged to panel 30*d* (not shown) in like manner. When the hinged panels 30*a,b,c,d* are in the stowed position such that their respective surfaces are flat against and parallel to each other and prior to activation of the shape-memory alloy wire, the shape-memory alloy straps 46,48 bend at a 180 degree angle around the edges of the frames 40. In the deployed position, after activation of the shape-memory alloy wire, the shape-memory alloy straps 46,48 are at an angle of zero degrees.

Insulated electric cables 56,57 are attached to the electronic assembly and controller 52. The controller 52 controls power and activation of circuit 1 and circuit 2 which activate the shape memory cable 55 and straps 46,48, respectively, to deploy the panels 30*a,b,c,d* in the shield as shown in FIG. 2B. The electric cables 56,57 form a circuit I which activates the shape-memory alloy cable 55 and a circuit 2 through electric cabling 42 which connects the controller 52 to the shape-memory alloy straps 46,48. Circuit 2 electric cabling 42 is routed along the outer sides of the frame 40 to the shape-memory alloy straps 46,48.

With continued reference to FIG. 2A, FIG. 2B depicts a sideview of a spacecraft showing the four deployable flat panels 30*a,b,c,d* attached to and in protective relationship with a cylindrical spacecraft shell 100. The panels 30*a,b,c,d* are non-conforming with the protected spacecraft surface. In this figure the spacecraft is represented by a module on a space station having an outer shell 100 with dimensions of 14.5 ft in diameter and about 40 feet long. As disclosed supra, each panel 30*a,b,c,d* is about 15 ft in diameter and about 10 feet long, thus, when deployed the panels form a non-conforrnal bumper shield 80 sufficient to protect the outer shell 100 of the module. Although one deployed bumper shield 80 is depicted in this figure, it is contemplated that additional bumper shields may be deployed around the module to completely cover and protect it.

Figure 3B:
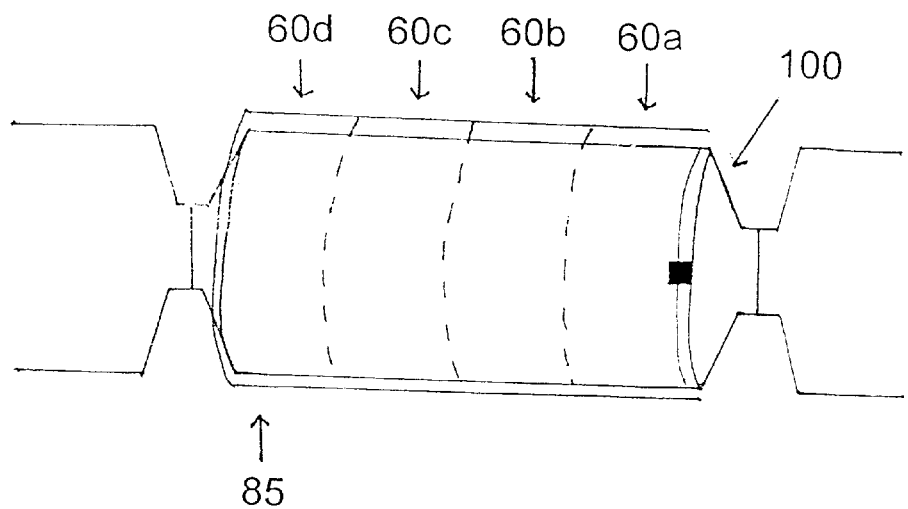
FIG. 3B depicts a series of four deployable curved panels attached to and protecting a cylindrical spacecraft shell. The curved panels conform with the protected spacecraft surface.
Figure 3A:
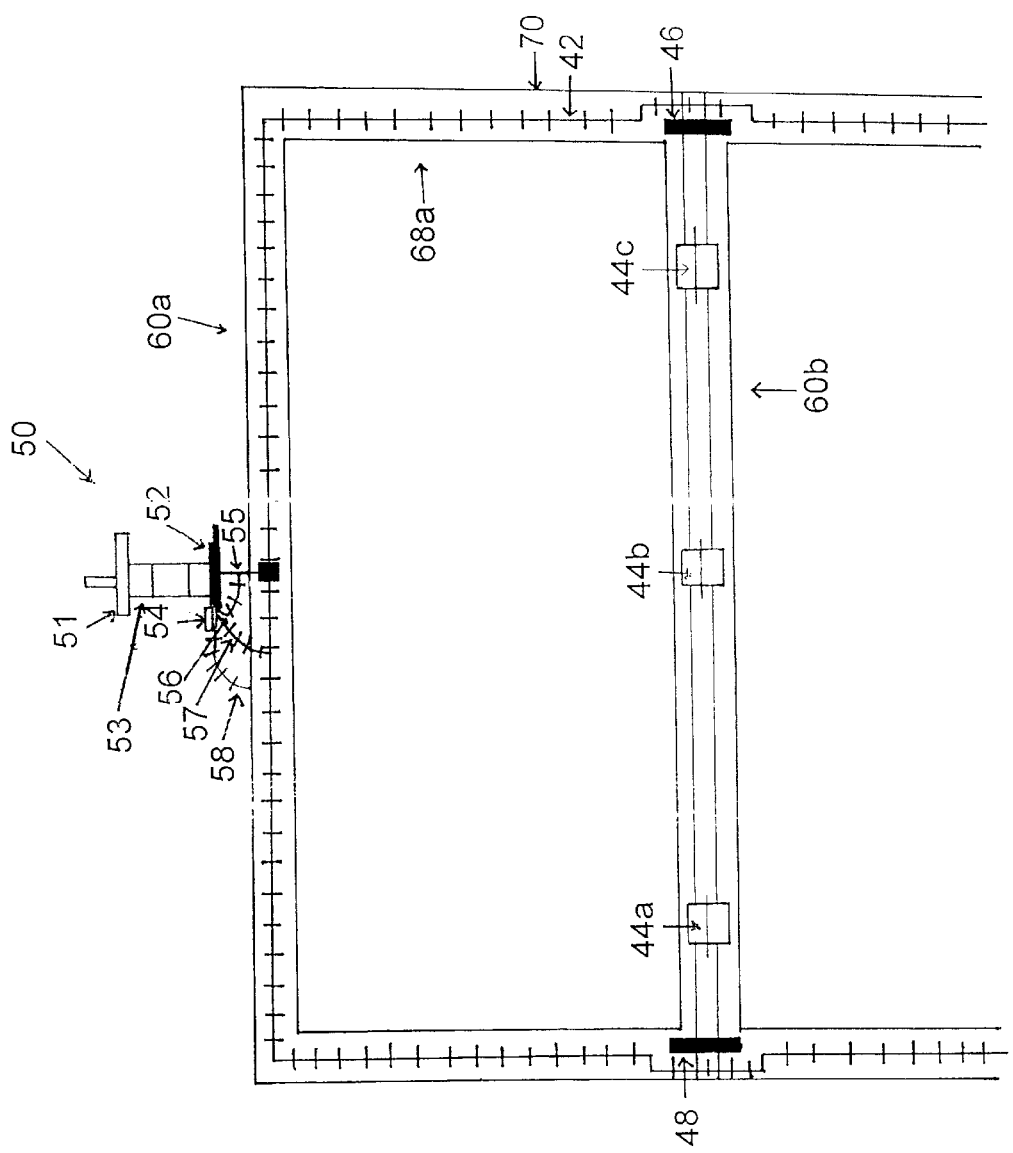
FIG. 3A depicts a front view of a deployable curved or conformal panel.

With continued reference to FIGS. 1C and 2A an alternative embodiment of the flat or non-conformal panel is depicted in FIG. 3A. A deployable curved or conformal panel 60*a* comprises an insulated hollow shape-memory metal frame 70 and a hybrid high-density wire and ceramic fabric bumper 68*a*. The bumper shield 68*a* is attached to the shape memory frame by means as described for bumper shield 38*a*. The panels 60*a,b,c,d* (60*b,c,d* not shown) have the same dimensions as panels 30*a,b,c,d*. The insulated electric cables 56,57 attached to the controller 52 have an additional electric cable 58, which is routed to the insulated shape-memory metal frame 70, that activates circuit 3 to curve panels 60*a,b,c,d* as shown in FIG. 3B. Otherwise, the attachment means 50, the shape-memory cable 55, the shape memory straps 46,48, the hinges 44*a,b,c* and the electric cabling 42,56,57 are as depicted for the non-conformal panels 30*a,b,c,d* and bumper shield 80. Prior to activation of circuit 3, the hinged panels 60*a,b,c,d* are flat as in FIGS. 2A and 2B.

With continued reference to FIGS. 2B and 3A, FIG. 3B depicts a sideview of a spacecraft showing the four deployable panels 60*a,b,c,d* attached to and in curved protective relationship with the cylindrical spacecraft shell 100 as in FIG. 2B. The panels 60*a,b,c,d* are conforming with the protected spacecraft surface. As disclosed supra, each panel 60*a,b,c,d* is about 15 ft in diameter and about 10 feet long, thus, when initially deployed the panels form a bumper shield 85 sufficient to protect the outer shell 100 of the module. After the initial deployment of the panels 60*a,b,c,d* the shape-memory frame 70 is activated by electric cable 58 which controls circuit 3 to curve and conform the bumper shield 85 to the outer shell 100 of the module. Again as in FIG. 2B, one deployed conformal bumper shield 85 is depicted in FIG. 3B; it is contemplated that additional bumper shields may be deployed around the module to completely cover and protect it in conforming relationship thereto.

FIGS. 4A–4D depict a deployment sequence for both the flat/nonconformal and curved/conformal deployable bumper shields from a stowed position. In the FIGS. 4A–4D the panels will be referred to as the flat, nonconforming panels 30*a,b,c,d* comprising the hypervelocity bumper shield 80 although the deployment sequence is used for the conformal panels 60*a,b,c,d* on hypervelocity bumper shield 85 as well. Thus, unless specifically indicated otherwise, deployment sequence steps pertain to all embodiments of the panels as described and depicted in FIGS. 2A and 3A.

Figure 4B:
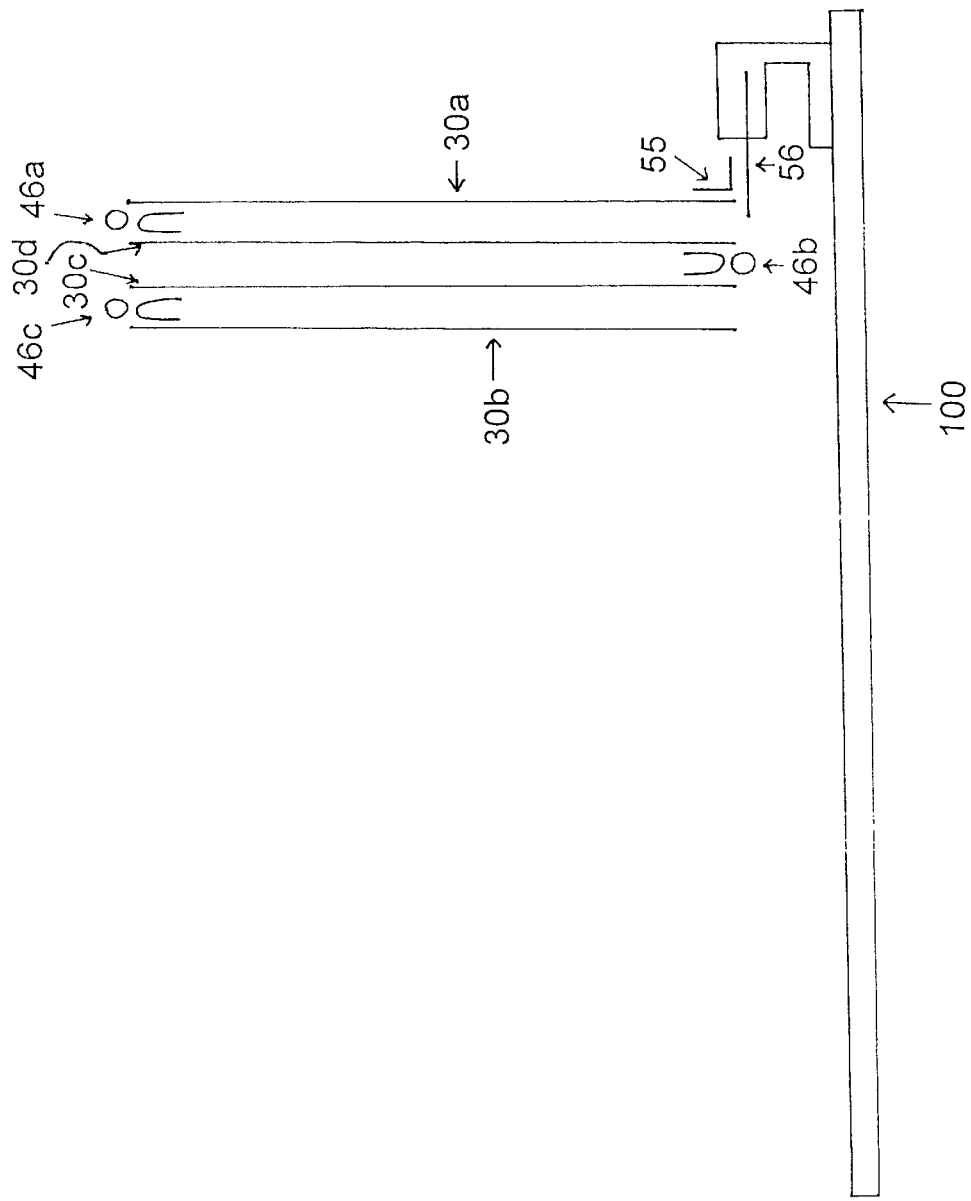

In FIG. 4A, a side view of the panels 30*a,b,c,d* in a stowed position is depicted. The hinging mechanism (not shown) and the flexibility of the shape memory cable 55 and shape memory straps 46*a,b,c*. allow the panels 30*a,b,c,d* to be stowed adjacent and parallel to one another and to the outer pressure wall or shell 100 of the structure, as in an accordion-like configuration. Straps 48*a,b,c* mare not shown due to perspective of the FIGS. 4A–4D but function simultaneously and identically to shape memory straps 46*a,b,c*.

The shape-memory cable 55 and the shape memory straps 46*a,b,c* are all initially at 0° as each strap 46*a,b,c* connecting the panels 30*a,b,c,d* to each other and the cable 55 connecting the first panel 30*a* to the attachment means 50 are folded back on themselves. The first panel 30*a* is attached via the shape-memory cable 55 to an attachment means 50, in this instance, a bracket. The attachment means 50 further comprises the electronics to operably connect the panels 30*a,b, c,d* to the structure and to activate the shape-memory alloy cable 55 and straps 46*a,b,c*.

Continuing to refer to FIG. 4A, the initial deployment step is depicted in FIG. 4B. A first circuit operably connected to the shape-memory alloy cable 55 is activated by electric cable 56 to deploy all the panels 30a,b,c,d to a position of 90° with reference to the outer pressure wall or shell 100. The panels 30a,b,c,d are still hinged adjacent and parallel to each other at the original stowed angle of 0° with reference to each other. That is, the first circuit only increases the angle of the shape-memory cable 55 with reference to the outer pressure wall or shell 100. This first step constitutes a partial deployment of the hypervelocity bumper shield 80.

Figure 4C:
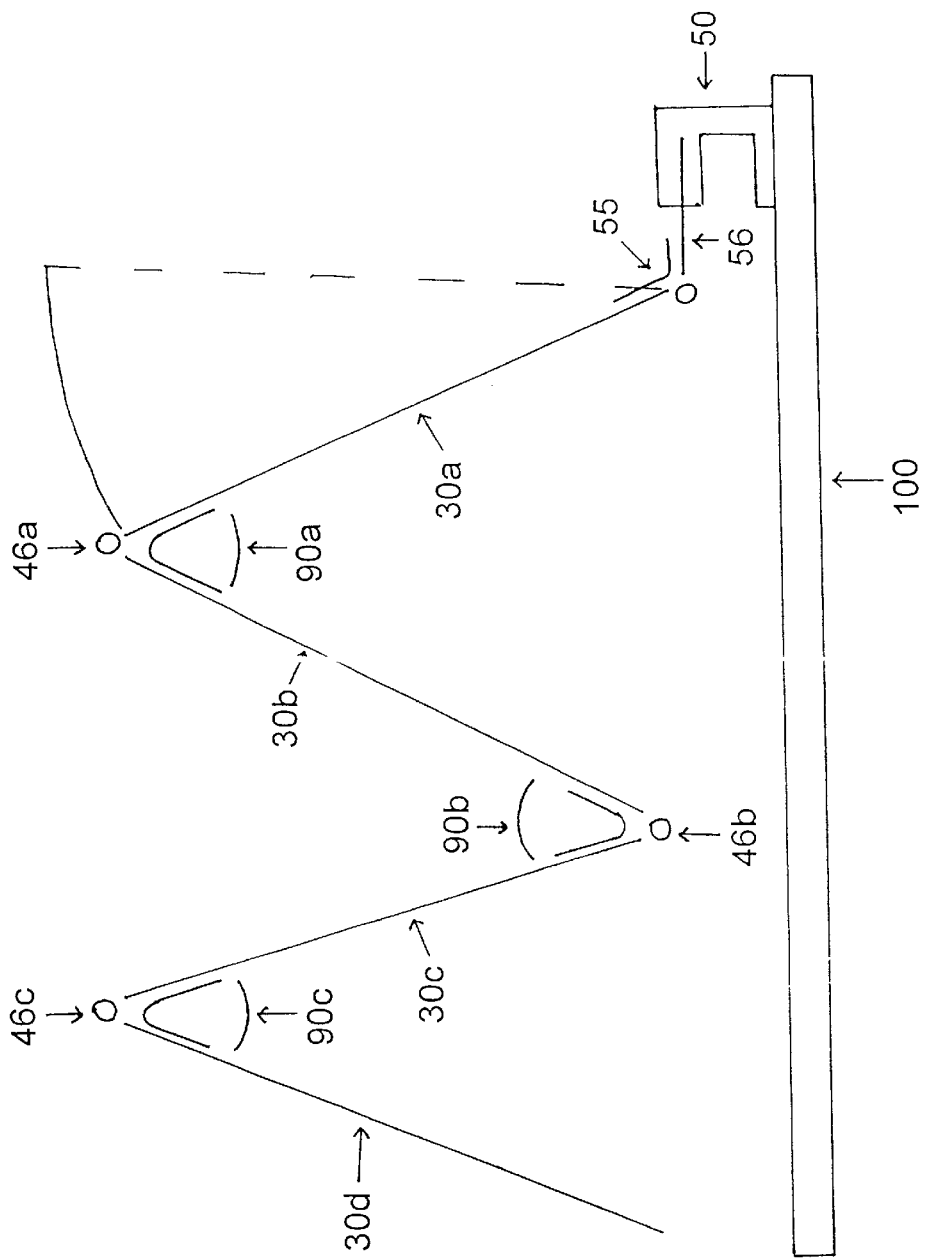

With further reference to FIG. 4B the next deployment step is depicted in FIG. 4C. The first circuit is not active and a second circuit activated by electric cable 57 itself activates the shape-memory straps 46a,b,c which move the panels 30a,b,c,d away from the accordion-like position by increasing the angles 90a,b,c of the shape-memory alloy straps 46a,b,c with reference to the initial stowed position of 0° to deploy them along the outer pressure wall or shell 100 of the structure. As this occurs, the angle of the cable 55 simultaneously increases so that the first panel 30a is deployed in conjunction with the remaining panels 30b,c,d, i.e., the first panel 30a is pulled along by the action of the other panels 30b,c,d. The second circuit continues to increase the angle of the shape memory alloy straps 46a,b,c until all panels 30a,b,c,d are completely deployed at an angle of 180° with respect to the initial stowed position of 0° as depicted in FIG. 4A.

Figure 4D:
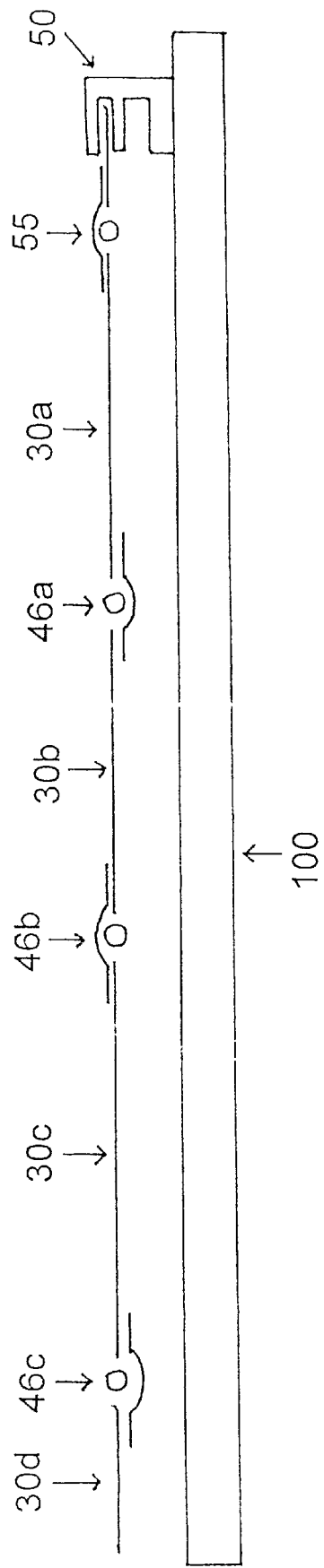

FIG. 4D depicts panels 30a,b,c,d in a fully deployed position. The panels 30a,b,c,d are disposed in covering and protective relation to the outer pressure wall or shell 100 of the structure. When fully deployed the angle of cable 55 and the angles 90a,b,c of the straps 46a,b,c are 180° with respect to the outer pressure wall or shell 100.

The panels depicted in FIGS. 4A–4D may be deployed in alternative sequences. For example, the hypervelocity bumper shield is initially attached to the structure such that the angle of the first shape-memory alloy cable 55 is at 90° and the angles 90a,b,c of the straps 46a,b,c on the remaining stowed panels 30b,c,d are at 0° as depicted in FIG. 4B. At this point electric cable 57 controlling the second circuit activates only the straps 46a (48a not shown) connecting the first panel 30a to the second panel 30b, the second panel 30b to the third panel 30c and the third panel 30c to the fourth panel 30d until the angle 90a of the straps 46a (48a not shown) on the first panel 30a are 90° relative to the first panel 30a and the angles 90b,c of the straps 46b,c on the second 30b, third 30c and fourth 30d panels are 180° relative to the outer pressure wall or shell 100 of the structure as shown for the second to fourth panels in FIG. 4D. At this point the electronic cable 56 controlling the first circuit is activated to increase the angle 90a of the first strap 46a relative to the first panel 30a another 90° so that all the panels 30a,b,c,d are linearly disposed at 180° as shown for all the panels in FIG. 4D.

It is also contemplated that all the panels 30a,b,c,d may be deployed simultaneously from a stowed position as depicted in FIG. 4B with the rate of deployment of the second 30b, third 30c and fourth 30d panels, as governed by the electronic cable 57 controlling the second circuit, being twice that of the rate of deployment of the first panel 30a, as governed by the electronic cable 56 controlling the first circuit. Thus, as the angle of the cable 55 on the first panel 30a increases another 90°, the angles 90a,b,c of the straps 46a,b,c on the second 30b, third 30c and fourth 30d panels simultaneously increase by 180° with all the panels 30a,b, c,d being deployed at the end of the sequence as depicted in FIG. 4D.

Any of the deployment sequences described in FIGS. 4A–4D may be used to deploy a conformal hypervelocity bumper shield 85 as depicted in FIG. 3B. After the final deployment as depicted in FIG. 4D, the electronic cable 58 controlling the shape memory frame 70, as shown in and described supra with reference to FIG. 3B, conforms the hypervelocity bumper shield 85 in protective relation to the outer pressure wall or shell 100 of the structure or module.

Figure 5A:
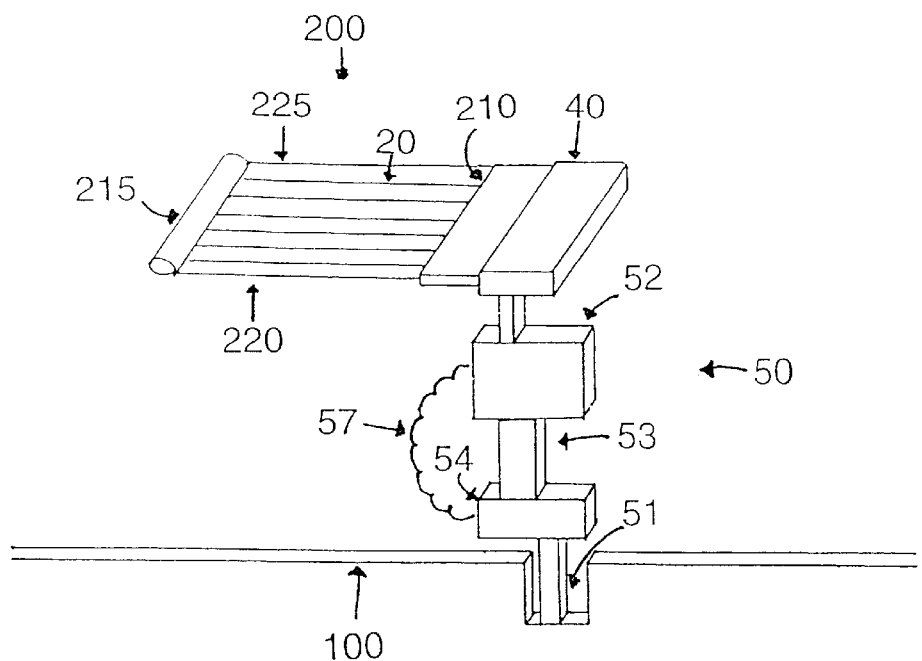
FIG. 5A depicts a perspective view of a deployable continuous bumper shield. The imbedded unidirectional memory-metal wires in this shield allow it to change shape in one-dimension.

Again, with reference to FIGS. 2 and 3, FIG. 5A depicts a deployable continuous roll bumper shield 200 of high density wire and hybrid cloth having a first side 210 and a second side 215 both about 15 feet wide and having a third side 220 and a fourth side 225 both about 40 feet long. Although this particular embodiment depicts dimensions for a shield used to protect modules, e.g., on a space station, it is contemplated that a rolled bumper shield can have those dimensions necessary to protect whatever structure or component thereof requires protection from meteroids or space debris. The bumper roll 200 is mounted at one end to a rigid cross-piece frame 40 made of suitable light-weight material such as aluminum or graphite-epoxy at the first side 210 by suitable means such as but not limited to grommets, bolts, screws, ties or other mechanical means or adhesive or Velcro. The bumper roll 200 contains imbedded unidirectional longitudinal strips or wires 20 of a shape memory alloy metal, e.g., nickel-titanium that provide deployment force and, further, provide stability for the final deployed bumper configuration.

The frame 40 with the rolled high density wire and hybrid cloth bumper shield 200 attached thereto is itself attached to the space vehicle at a first end via an attachment fitting 50. The attachment fitting 50 is operably connected to the space vehicle at a first end 51 and to an electronic assembly and controller 52 at a second end by a boom 53 at least 4 inches to about 12 inches long. A power/data channel connection 54 plugs into the space vehicle power and data management systems. An electric cable 57 connects the controller 52 to the unidirectional shape memory alloy strips or wires 20 in the bumper roll 200. The cable is routed along the frame 40 either externally to the frame or internally through the hollow core. The controller 52 controls a circuit 1, through electric cable 57, which activates the unidirectional shape memory wire alloy 20 thereby unrolling the bumper roll 200 and deploying the shield 200 in a flat, non-conformal sheet in protective and covering relation to the outer pressure wall or shell 100 of the space vehicle. When the continuous bumper shield 200 is in the stowed position, it is rolled against the frame 40.

Figure 5B:
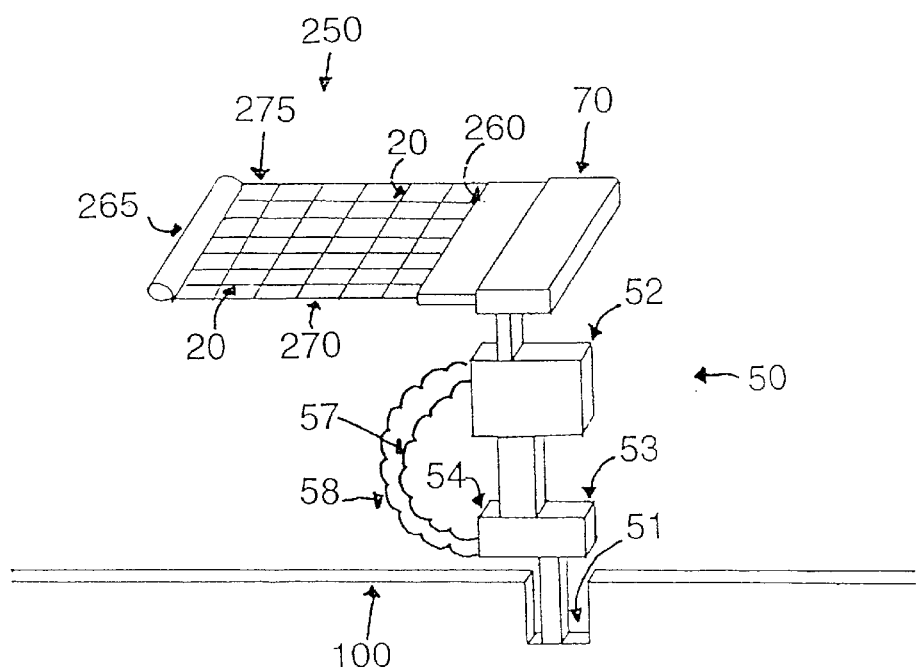
FIG. 5B depicts a perspective view of a deployable curved continuous bumper shield. The imbedded bi-directional memory-metal wires in this shield allows it to change shape in two-dimensions.

In an alternate embodiment of and with continued reference to FIG. 5A, FIG. 5B depicts a deployable continuous roll bumper 250 with two-directional shape-memory alloy wire. In this embodiment, the bumper roll 250 is attached to a flexible frame 70 by suitable means such as, but not limited to grommets, bolts, screws, ties or other mechanical means or adhesive or Velcro. As in FIG. 5A, the first or unidirectional longitudinal shape-memory wire 20 causes the bumper roll 250 to unroll into a flat shape upon activation of circuit 1. An additional electric cable 58 connects the controller 52 to the second or transverse shape-memory alloy wire 20. The controller controls a circuit 2, through electric cable 58, which activates the transverse shape-memory alloy wires 20 to curve the unrolled flat bumper 250 conformal with and in protective relation to the outer pressure wall or shell 100 of the space vehicle.

Figure 5D:
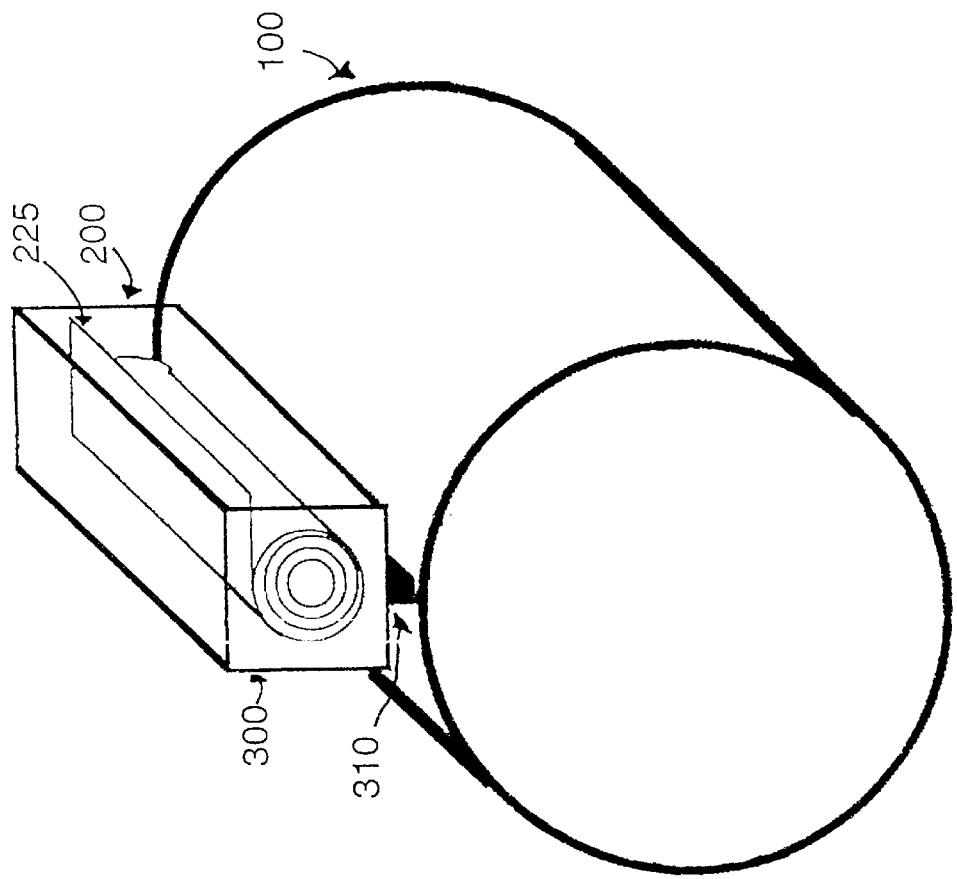
FIGS. 5C–5F depicts an alternative deployment sequence for a deployable curved continuous bumper shield.
Figure 5C:
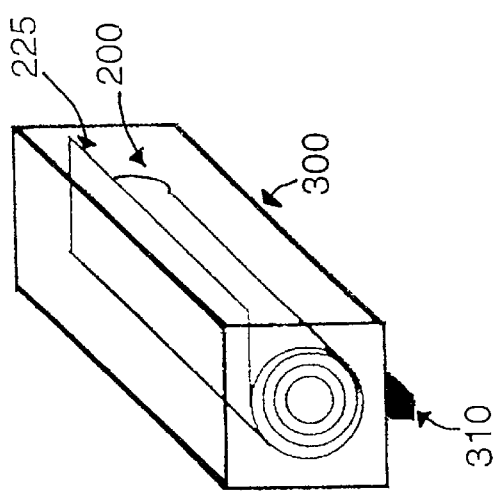
Figure 5E:
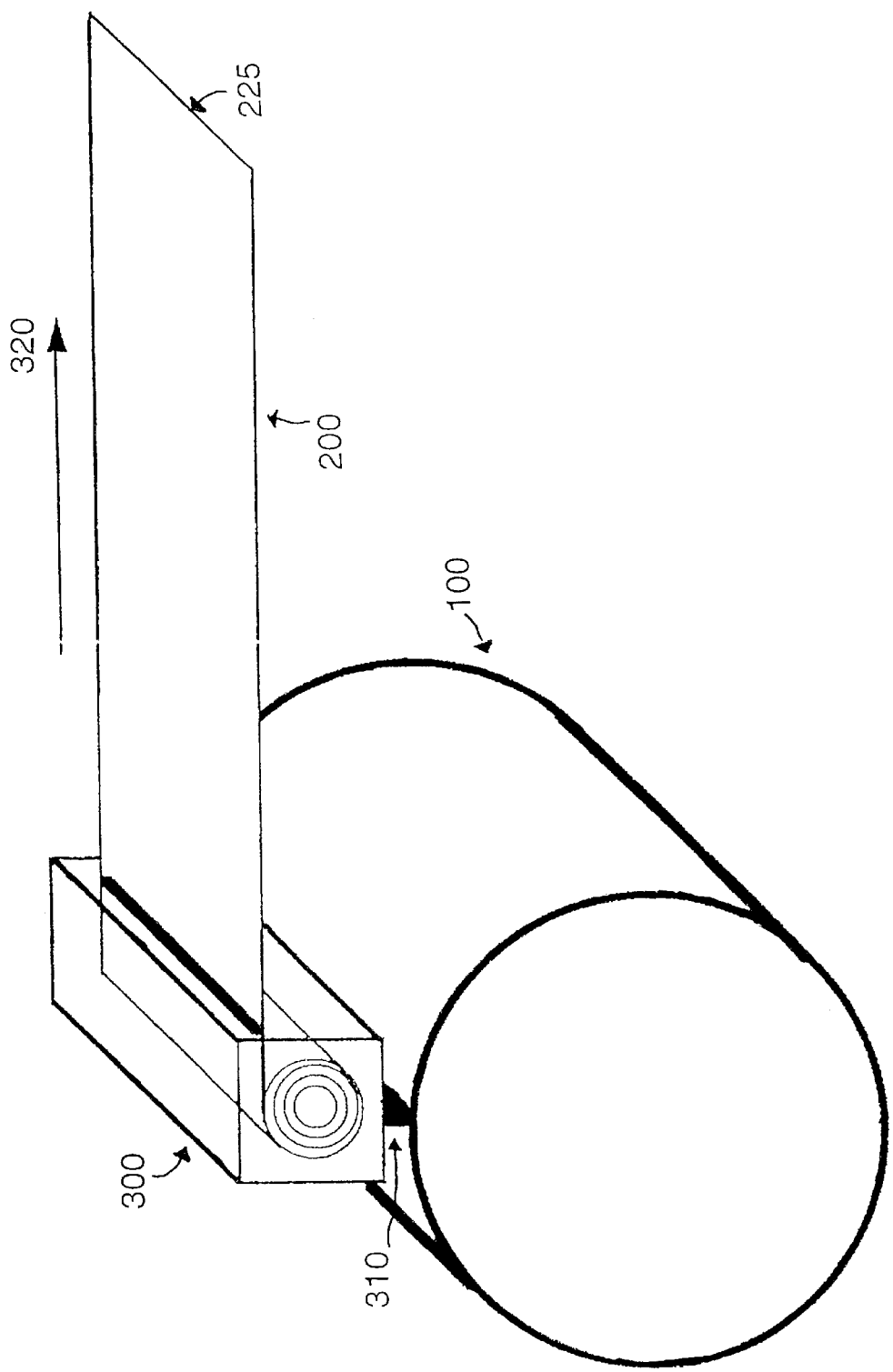
Figure 5F:
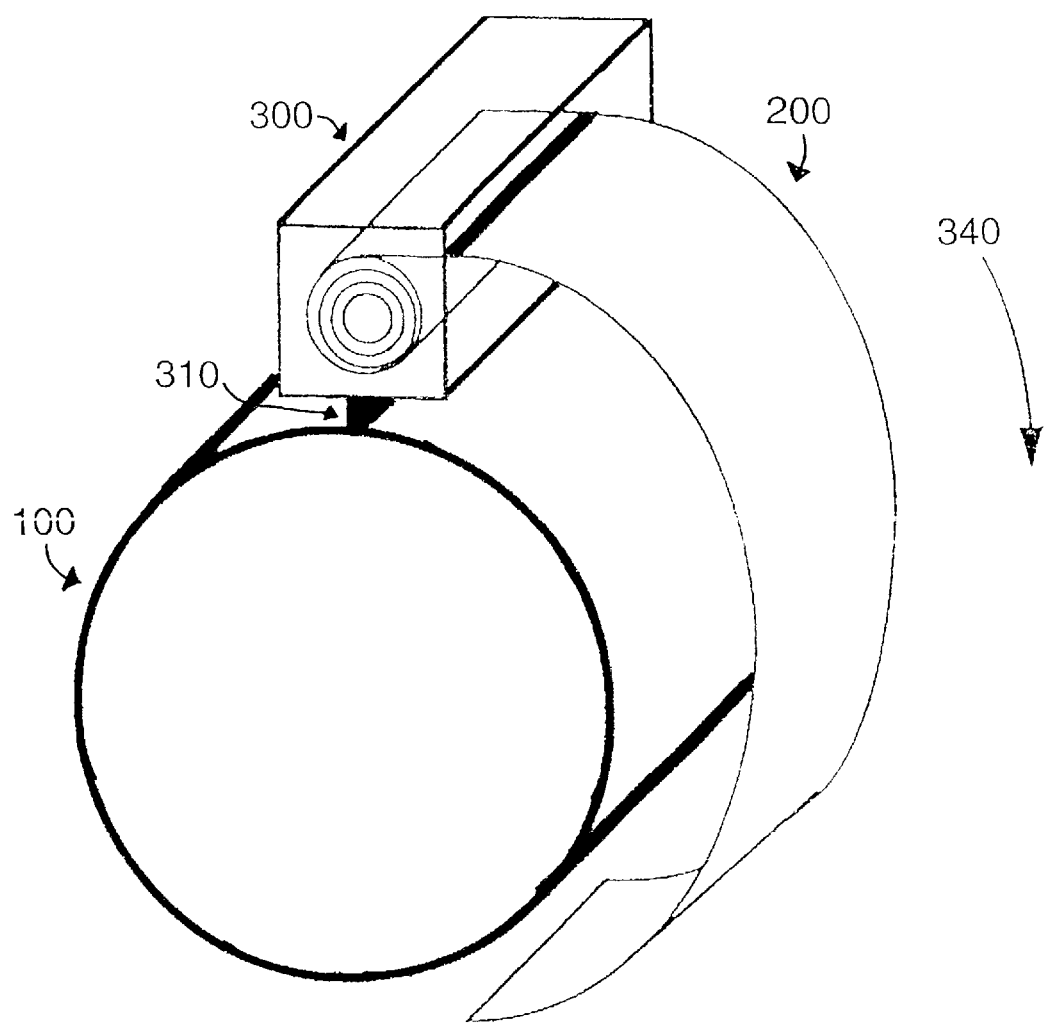

FIGS. 5C–5F depict an alternate method of deploying a continuous bumper shield having unidirectional longitudinal shape memory alloy wires as in FIG. 5A. In FIG. 5C the bumper shield 200 is rolled and disposed within a canister 300 such that the fourth side 225 of the rolled bumper shield 200 is positioned to move off the top of the roll in the canister 300. As depicted in FIG. 5D, the canister may be attached to an outer surface 100 of the structure by an attachment means 310 such as Velcro. FIG. 5E depicts initial deployment of the bumper shield roll 200 by a motor (not shown) away from the canister 300 in a direction 320 perpendicular to the transverse axis of the rolled bumper shield 200. At this point, as shown in FIG. 5E, the unidirectional longitudinal shape memory wires (not shown) comprising the continuous bumper shield 200 are activated to conform the shield in a direction 340 that is in protective relation to the outer surface 100 of the structure.

Figure 6A:
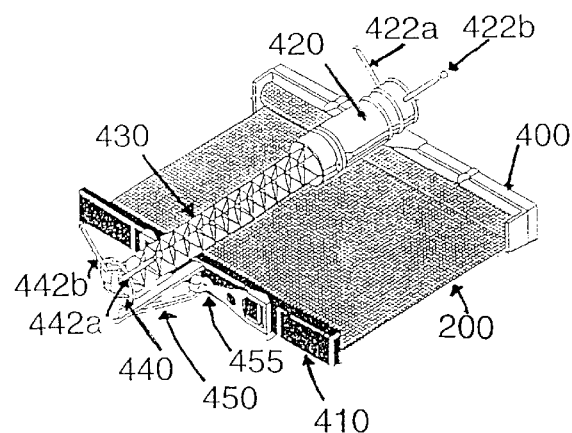
FIG. 6A depicts a single roll of shielding fabric deployed by a device having an extendible/retractable mast.
Figure 6B:
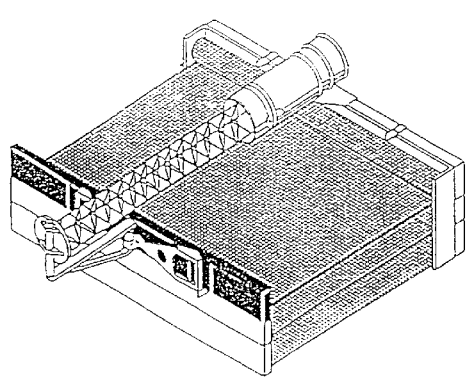
FIGS. 6B–6C depict the device of FIG. 6A with three and five rolls of shielding fabric.
Figure 6C:
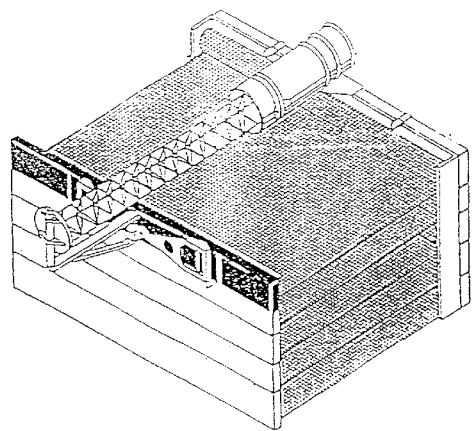

It is further contemplated that multiple layers of flexible bumper shielding be deployed simultaneously. With continued reference to FIGS. 1A and 1B, FIG. 6A depicts a device to deploy rolled shielding fabric to augment existing shielding structures on a space vehicle. As demonstrated in FIGS. 6B and 6C, as many as five bumpers comprising shielding fabric can be deployed from stacked cylindrical storage cassettes containing the shielding fabric wound on rolls. The shielding fabric may be about 15 feet wide and can unroll to a length of about 40 feet or more depending on the application. At these dimensions the shield can be used to protecting Space Station modules from meteoroid and orbital debris impacts. The shielding fabric can be a wire mesh or a hybrid cloth as depicted in FIGS. 1A and 1B. For each layer of shielding fabric, the fabric is wound on a roll and is placed in a shield storage cassette having an open front. Although multiple shielding layers may be deployed, for the purposes of this embodiment the device deploys a single layer of shielding fabric as referenced in FIG. 6A.

In FIG. 6A the shield storage cassette 400 has a shield storage cassette cover 410 with a front side disposed away from the open front of the storage cassette 400 and a back side disposed toward the open front of the storage cassette 400 in covering relation to the shield storage cassette 400. A front edge of the shielding fabric is mechanically attached via suitable means to the back side of the shield storage cassette cover 410 which opens and closes along a plane perpendicular to the face of the cover 410 unrolling and rolling the shielding fabric 200 from or onto the roll. When the shield storage cassette cover 410 has opened a maximum distance, the shield is fully deployed.

A mast storage canister 420 having an open front end and a back end with two mounting attach points 422a,b that attach to the outside of the equipment or section of the space vehicle to be protected, is itself rotatably mounted to the top of the shield storage cassette 400 at the back end of the canister 420. The canister 420 lies along the top side of the shield storage cassette 400 prior to attachment to the space vehicle when the shield fabric 200 is rolled and stored within the storage cassette 400. Prior to deployment of the shield 200, the canister 420 rotates through 90 degrees in a plane parallel to the subsequently deployed shield 200. A retractable mast 430 is stored within the mast storage canister 420.

The retractable mast has a circular mast cover 440 at a front end that has a front face disposed away from the open front end of the storage canister 420 and a back face disposed in covering relation towards the open front end of the storage canister 420. The mast cover 440 engages the open front end of the mast storage canister 420 when the mast 430 is completely retracted therein. The front face of the mast cover 440 has two mounting attach points 442a,b fastened thereto for attaching the deployed shield 200 to the outside of the equipment or section of the space vehicle to be protected. The back face of the mast cover 440 is attached to a first extendible/retractable end of the mast 430. The mast cover 440 opens and closes along a plane identical to that of the shield storage cassette cover 410. When the mast cover 440 has opened a maximum distance, the shield 200 is fully deployed.

An extending means 450 is attached at a rearward end to the front side of the shield storage cassette cover 410 and at a forward end to the front face of the mast cover 440 to extend the mast 430. The extending means 450 comprises an L-shaped hinge 455 hinged at the rearward end attached to the shield storage cassette cover 410 and rigidly fastened at the forward end to the front face of the mast cover 440.

Figure 7A:
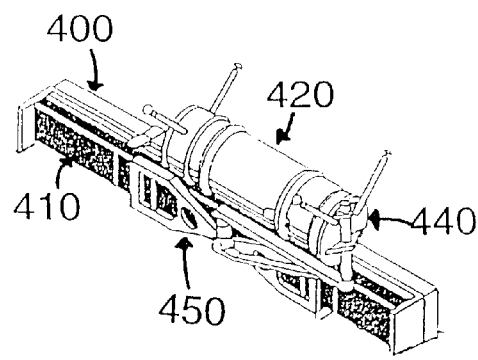
FIGS. 7A–7C depict the deployment steps for the device of FIG. 6A. The device of FIGS. 6B and 6C would be deployed via similar deployment steps.

With further reference to FIG. 6A, FIGS. 7A–7C depict the bumper shield deployment steps. In FIG. 7A the mast 430 and bumper shield 200 are stowed. The mast cover 440 engages the open front end of the mast storage canister 420 and the shield storage cassette cover 410 engages the open front of the shield storage cassette 400. Prior to initiation of deployment, the mast storage canister 420 lies along the top side of the shield storage cassette 400 and the hinged strut 450 is proximately parallel to the front side of the shield storage cassette cover 410.

Figure 7B:
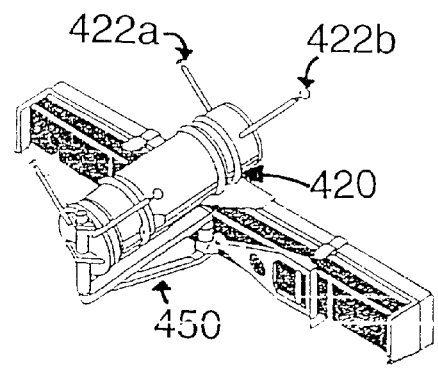

In FIG. 7B the hinged strut 450 swings the mast storage canister 420 90 degrees so that the longitudinal axis of the canister 420 is perpendicular to that of the rolled bumper shield 200. At this point the canister 420 is attached to the outside of the space vehicle equipment element to be protected via the two mounting attach points 422a,b.

Figure 7C:
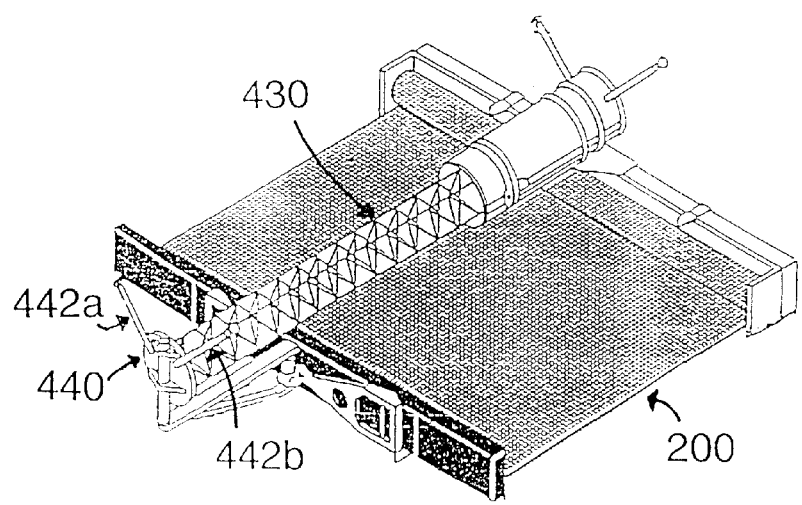

FIG. 7C shows the mast 430 extending to deploy the bumper shield 200. When the shield is fully deployed it can be tensioned with tensioning cables or pulleys via a motor (not shown). The mast cover 440 is then attached to the space vehicle via the two mounting attach points 442a,b.

Any patents or publications mentioned in this specification are indicative of the levels of those skilled in the art to which the invention pertains. These patents and publications are herein incorporated by reference to the same extent as if it was indicated that each individual publication was incorporated specifically and individually by reference.

One skilled in the art will readily appreciate that the present invention is well adapted to carry out the objects and obtain the ends and advantages mentioned, as well as those inherent therein. It will be apparent to those skilled in the art that various modifications and variations can be made in practicing the present invention without departing from the spirit or scope of the invention. Changes therein and other uses will occur to those skilled in the art which are encompassed within the spirit of the invention as defined by the scope of the claims.

What is claimed is:

1. An apparatus for deploying a hypervelocity shield on a structure in exoatmospheric space comprising:

a hypervelocity shield comprising:
a mesh formed of wires of a ductile material, at least one of said wires optionally comprising a shape-memory alloy; and
a supporting matrix formed of strands of a material having a density less than that of said ductile material; said strands interwoven with said mesh and comprising means for supporting the mesh in a predetermined configuration;

a frame structure attached to at least one edge of said hypervelocity shield further comprising an insulated electric cable to deploy said hypervelocity shield, said frame structure supports said hypervelocity shield; and a means of operably attaching said hypervelocity shield to the structure.

2. The apparatus of claim 1, wherein said ductile material consists essentially of a material selected from the group consisting of cadmium, zinc, tin, lead, tantalum, copper, steel and an alloy of said material.

3. The apparatus of claim 1, wherein said ductile material has a density at least as great as the density of particles from which the structure is to be shielded.

4. The apparatus of claim 3, wherein the density of said ductile material is about 2.3 grams per cubic centimeter to about 14 grams per cubic centimeter.

5. The apparatus of claim 1, wherein said ductile material has a melting point of about 430° C.

6. The apparatus of claim 1, wherein said supporting matrix is formed of strands of a ceramic cloth.

7. The apparatus of claim 1, wherein said shape-memory alloy is a martensitic alloy comprising at least two elements selected from the group consisting of nickel, titanium, aluminum, silicon, manganese, iron, copper, zinc, silver, cadmium, indium, tin, platinum, gold and thallium.

8. The apparatus of claim 7, wherein said shape-memory alloy is nickel-titanium.

9. The apparatus of claim 1, wherein said hypervelocity shield is attached to said frame structure via clips and brackets, releasable fabric fasteners, sewing or a combination thereof.

10. The apparatus of claim 1, wherein said electric cables are routed adjacent to and internal to said frame structure.

11. The apparatus of claim 1, wherein said means of operably attaching said hypervelocity shield to said structure comprises:
an attachment fitting connected to said structure;
a power and data channel connection;
a boom connecting said attachment fitting to said power and data channel connection; and
an electronic assembly and controller component connected to said power and data channel, said component electrically connected to and controlling power to said electric cable to deploy said hypervelocity shield.

12. The apparatus of claim 1, wherein said boom is about four inches to about twelve inches long.

13. The apparatus of claim 1, wherein said apparatus comprises:
the hypervelocity shield formed of a plurality of panels having a rectangular shape and further comprising a hinging means to connect said panels, said panels hinged so as to extend linearly one from the other when said panels are fully deployed; and
the frame structure disposed around at least two outer edges of each of said panels;
said frame structure further comprising:
straps formed of a shape-memory alloy, said straps operably attached externally to said frame structure;
wherein a first of said straps connects a first of said panels to said attaching means, said attaching means further comprising a second insulated electric cable controlled by said controller and activating said first strap; and
wherein a second set of said straps connects said panels one to the other, said first strap and said second set of straps deploying said panels upon activation of the shape-memory alloy by said first insulated electric cable adjacent to said frame structure.

14. The apparatus of claim 13, wherein if said frame structure comprises said shape-memory alloy, said attaching means further comprises a third insulated electric cable controlled by said controller and activating said shape-memory frame to conform to a predetermined configuration.

15. The apparatus of claim 1, wherein said apparatus comprises:
the hypervelocity shield formed of a continuous sheet of said mesh and said support matrix, said sheet having a length greater than its width, further comprising a plurality of wires formed of said shape-memory alloy disposed along the length of said sheet;
the frame structure disposed across the width of a first end of said sheet, said sheet rolled up and adjacent to said frame structure, wherein said insulated electric cable controlled by said controller activates said length-wise shape-memory wires to conform to a predetermined configuration thereby unrolling and deploying said continuous sheet.

16. The apparatus of claim 15, said apparatus further comprising:
a plurality of wires formed of said shape-memory alloy disposed along the width of said sheet; and
a second insulated electric cable controlled by said controller to activate said width-wise shape-memory wires to conform said deployed continuous sheet to a second predetermined configuration.

17. A method of deploying a hypervelocity shield on a structure in exoatmospheric space comprising the steps of:
attaching the apparatus of claim 1 to the structure via said attachment means;
routing power to said insulated electric cable via said controller; and
deploying the hypervelocity shield.

18. A method of deploying a hypervelocity shield on a structure in exoatmospheric space comprising the steps of:
attaching the apparatus of claim 13 to the structure via said attachment means, wherein said plurality of panels comprising said apparatus are in a stowed position of 0° relative to the structure;
routing power to said first shape-memory strap via said second insulated electric cable to partially deploy said first panel 90° relative to the structure;
wherein the remaining panels are still in the stowed position relative to said first panel;
disconnecting power to said second insulated electric cable to stop deployment of said first panel; and
routing power to said first insulated electric cable to activate the second set of shape memory straps thereby fully deploying all of said plurality of panels.

19. The method of claim 18, wherein said apparatus is attached such that said partial deployment of said first panel to an angle of 90° relative to said structure is incorporated into said attaching step, the method comprising a step alternative to the step of routing power to said first insulated electric cable, said step comprising:
simultaneously routing power to said first cable and said second cable wherein said first shape memory strap is activated by said second cable to deploy said first panel at a rate that is half the rate of deployment of the remaining panels thereby fully deploying all of said plurality of panels.

20. The method of claim 18, wherein if said frame structure is insulated and formed of a shape-memory alloy, the method further comprises the step of:
routing power to a third cable to activate the insulated shape-memory frame to conform to a predetermined configuration after deployment of said plurality of panels.

21. A method of deploying a hypervelocity shield on a structure in exoatmospheric space comprising the steps of:
attaching the apparatus of claim 15 to the structure via said attachment means;

routing power to an insulated electric cable to activate the plurality of length-wise shape-memory wires to conform to a predetermined configuration; and deploying the continuous sheet comprising the hypervelocity shield.

22. The method of claim 21, wherein if said continuous sheet further comprises a plurality of shape-memory wires disposed along the width of the sheet, said method further comprises the step of:

routing power to a second electric cable to activate the plurality of widthwise shape-memory wires to conform to a predetermined configuration after deployment of said continuous sheet.

23. An apparatus to deploy at least one hypervelocity shield on a structure in exoatmospheric space comprising:

at least one hypervelocity shield, each of said attached to and wound on a roll, said shield comprising:
  a mesh formed of wires of a ductile material; and
  a supporting matrix formed of strands of a material having a density less than that of said ductile material; said strands interwoven with said mesh and comprising means for supporting the mesh in a predetermined configuration;

a shield storage cassette, said storage cassette containing at least one of said rolls of shielding, said rolls of shielding individually stored one on the other, said storage cassette comprising:
  a shield storage cassette cover, said cassette cover in covering relationship to an open end of said cassette when said roll(s) of shielding are stored therein, said cassette cover having a front side facing outwardly and a back side opposite said front side; said back side comprising a means of individually attaching in parallel relationship a front edge of each of said rolls of shielding; wherein said cover opens along a plane perpendicular to the face of said cover;

a mast storage canister having an open front end and a closed back end opposite said front end, said canister rotatably mounted to the top of said shield storage cassette, said storage canister adjacent to and parallel to a top side of said storage cassette wherein said plane or rotation is parallel to that of a subsequently deployed shield, said canister comprising;
  an extendible/retractable mast disposed within said canister;
  a circular mast cover disposed in covering relationship to said open front end of said canister when said mast is retracted therein, said mast cover having a front side facing outwardly and having two mounting attach points thereon comprising means to attach said deployed shields to said structure and a back side opposite said front side; said back side comprising a means of attaching a front edge of said retractable mast;
  two mounting attach points fastened external to and at the back of said mast storage canister, said mounting attach points comprising means to attach said apparatus to said structure; and
  an extending means to simultaneously extend said mast and open said shield storage cassette cover comprising a hinging mechanism, a forward arm of said hinge attached to said front face of said mast cover and a rearward arm of said hinge attached to said front face of said cassette cover, wherein said forward arm of said hinge rotates in a plane parallel to that of said subsequently deployed shields.

24. The apparatus of claim 23, wherein said ductile material consists essentially of a material selected from the group consisting of cadmium, zinc, tin, lead, tantalum, copper, steel and an alloy of said material.

25. The apparatus of claim 23, wherein said ductile material has a density at least as great as the density of particles from which the structure is to be shielded.

26. The apparatus of claim 25, wherein the density of said ductile material is about 2.3 grams per cubic centimeter to about 14 grams per cubic centimeter.

27. The apparatus of claim 23, wherein said ductile material has a melting point of about 430° C.

28. The apparatus of claim 23, wherein said supporting matrix is formed of strands of a ceramic cloth.

29. A method of deploying at least one hypervelocity shield on a structure in exoatmospheric space, comprising the steps of:

attaching the apparatus of claim 23 to said structure at said mounting attach points on said mast storage container;

rotating said mast storage container 90°;

rotating said forward arm of said hinging means 90°;

opening said mast storage cover to fully extend said mast; and attaching the mast storage cover to said structure at said mounting attach points on the front face of said mast storage cover thereby deploying said at least one hypervelocity shields.

30. A method of deploying a hypervelocity shield on a structure in exoatmospheric space comprising the steps of:

attaching a canister to an outer surface of said structure, said canister containing said hypervelocity shield-rolled therein, wherein said hypervelocity shield is formed of:
  a continuous sheet of mesh having a length greater than its width, said mesh formed of wires of a ductile material;
  a supporting matrix formed of strands of a material having a density less than that of said ductile material; and
  a plurality of wires formed of a shape-memory alloy disposed along the length of said sheet of mesh;

deploying said hypervelocity shield through an opening on a front face of said canister via a motor means; and thermally activating said shape memory wires via an electrical means to conform said hypervelocity shield in protective relation to the outer surface of said structure.

31. The method of claim 30, wherein said canister is attached to the outer surface of said structure with releasable fabric fasteners.

32. The method of claim 30, wherein said ductile consists essentially of a material selected from the group consisting of cadmium, zinc, tin, lead, tantalum, copper, steel and an alloy of said material.

33. The method of claim 30, wherein said ductile material has a density at least as great as the density of particles from which the structure is to be shielded.

34. The method of claim 33, wherein the density of said ductile material is about 2.3 grams per cubic centimeter to about 14 grams per cubic centimeter.

35. The method of claim 30, wherein said ductile material has a melting point of about 430° C.

36. The method of claim 30, wherein said supporting matrix is formed of strands of a ceramic cloth.

37. The method of claim 30, wherein said shape-memory alloy is a martensitic alloy comprising at least two elements selected from the group consisting of nickel, titanium, aluminum, silicon, manganese, iron, copper, zinc, silver, cadmium, indium, tin, platinum, gold and thallium.

38. The method of claim 37, wherein said shape-memory alloy is nickel-titanium.

39. The apparatus of claim 1, wherein said frame structure is insulated and formed of said shape memory alloy.

40. The apparatus of claim 1, wherein said electric cables are routed adjacent to and external to said frame structure.

* * * * *